US008944641B2

(12) United States Patent
Kasai

(10) Patent No.: US 8,944,641 B2
(45) Date of Patent: Feb. 3, 2015

(54) LIGHTING DEVICE, DISPLAY DEVICE AND TELEVISION RECEIVER

(75) Inventor: Nobuhiro Kasai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 13/512,709

(22) PCT Filed: Nov. 17, 2010

(86) PCT No.: PCT/JP2010/070438
§ 371 (c)(1),
(2), (4) Date: May 30, 2012

(87) PCT Pub. No.: WO2011/074366
PCT Pub. Date: Jun. 23, 2011

(65) Prior Publication Data
US 2012/0236204 A1 Sep. 20, 2012

(30) Foreign Application Priority Data

Dec. 18, 2009 (JP) ................................. 2009-287568

(51) Int. Cl.
*F21V 7/00* (2006.01)
*G09F 13/04* (2006.01)
(Continued)

(52) U.S. Cl.
CPC .... *G02F 1/133603* (2013.01); *G02F 1/133604* (2013.01); *G02F 1/133605* (2013.01); *G02F 1/133608* (2013.01); *G02F 1/133611* (2013.01); *G02F 2001/133607* (2013.01)
USPC .... 362/297; 362/97.2; 362/97.3; 362/217.05; 362/241; 362/341; 362/346

(58) Field of Classification Search
CPC ............................................... G02F 1/133605

USPC .................. 362/97.1–97.3, 217.05, 241, 247, 362/296.01, 297, 341, 346; 349/58, 64
See application file for complete search history.

(56) References Cited

U.S. PATENT DOCUMENTS 4,267,489 A * 5/1981 Morohashi .................... 315/324
5,271,077 A * 12/1993 Brockman et al. .............. 385/31
(Continued)

FOREIGN PATENT DOCUMENTS

CN 101529151 A 9/2009
JP 2005-322645 A 11/2005
(Continued)

OTHER PUBLICATIONS

Official Communication issued in International Patent Application No. PCT/JP2010/070438, mailed on Dec. 28, 2010.

*Primary Examiner* — Ismael Negron
*Assistant Examiner* — Erin Kryukova
(74) *Attorney, Agent, or Firm* — Keating & Bennett, LLP

(57) ABSTRACT

A backlight unit includes: an LED; a chassis including a bottom plate provided on a side opposite to a light exit side; and a first reflection sheet. The first reflection sheet includes a quadrangular bottom portion extending along the bottom plate, and two raised portions raised from each of two adjacent sides of the quadrangular bottom portion toward the light exit side, a joint provided between two adjacent side edges of the raised portions. The side edge of a first one of the raised portions includes a facing portion facing the side edge of a second one of the raised portions in a direction in which the first one of the raised portions is raised from the quadrangular bottom portion, and the first one of the raised portions and facing portion bulge toward the light exit side to have an arched shape.

21 Claims, 29 Drawing Sheets

(51) Int. Cl.
*G09F 13/08* (2006.01)
*F21V 1/00* (2006.01)
*F21V 5/00* (2006.01)
*F21V 11/00* (2006.01)
*G02F 1/1335* (2006.01)

(56) References Cited

U.S. PATENT DOCUMENTS

| | | | |
|---|---|---|---|
| 5,274,533 A * | 12/1993 | Neary et al. | 362/225 |
| 5,568,680 A * | 10/1996 | Parker | 29/557 |
| 6,640,605 B2 * | 11/2003 | Gitlin et al. | 72/379.2 |
| 7,322,712 B2 * | 1/2008 | Lai | 362/29 |
| 7,438,436 B2 * | 10/2008 | Moon | 362/247 |
| 7,914,180 B2 * | 3/2011 | Lee | 362/341 |
| 8,610,154 B2 * | 12/2013 | Song et al. | 257/99 |
| 2002/0105807 A1 * | 8/2002 | Loughrey | 362/278 |
| 2005/0265020 A1 | 12/2005 | Kim | |
| 2006/0044780 A1 * | 3/2006 | Kim | 362/29 |
| 2006/0087827 A1 | 4/2006 | Jung et al. | |
| 2007/0230206 A1 * | 10/2007 | Hsiao et al. | 362/560 |
| 2007/0247856 A1 * | 10/2007 | Wang et al. | 362/297 |
| 2008/0298072 A1 * | 12/2008 | Chang | 362/308 |
| 2009/0168405 A1 * | 7/2009 | Yoo et al. | 362/97.2 |
| 2009/0268432 A1 * | 10/2009 | Noh et al. | 362/97.1 |
| 2010/0014015 A1 * | 1/2010 | Ho et al. | 349/58 |
| 2010/0053455 A1 | 3/2010 | Kamada et al. | |
| 2010/0157196 A1 * | 6/2010 | Lee et al. | 349/62 |
| 2012/0176557 A1 * | 7/2012 | Shimizu | 348/790 |
| 2013/0188100 A1 | 7/2013 | Ikuta | |

FOREIGN PATENT DOCUMENTS

| | | |
|---|---|---|
| JP | 2006-120644 A | 5/2006 |
| JP | 2008-140646 A | 6/2008 |
| WO | 2011/067995 A1 | 6/2011 |

* cited by examiner

LIGHTING DEVICE, DISPLAY DEVICE AND TELEVISION RECEIVER

TECHNICAL FIELD

The present invention relates to a lighting device, a display device, and a television receiver.

BACKGROUND ART

For example, a liquid crystal panel for a liquid crystal display device such as a liquid crystal television does not emit light, and thus a backlight unit is required as a separate lighting device. The backlight unit that is provided at a rear side (side opposite to a display surface) of the liquid crystal panel includes: a chassis that is open on a side close to the liquid crystal panel; a light source housed in the chassis; a reflection sheet provided along an inner surface of the chassis and configured to reflect light toward the opening of the chassis; and an optical member (such as a diffuser sheet) provided at the opening of the chassis and configured to efficiently direct the light emitted from the light source to the liquid crystal panel.

For the power saving or the like of the above-configured backlight device, LEDs may be used as the light source. In such a backlight device using the LEDs, a great number of LEDs is arranged, for instance, on a bottom plate of the chassis in a planar arrangement. However, when the light exiting from the backlight unit is observed from the front side, dark regions due to shortage of light amount may be observed at four corners of the screen. As one solution for the above problem, a technique disclosed in Patent Document 1 described below is proposed.
Patent Document 1: Japanese Unexamined Patent Publication No. 2006-120644

Problem to be Solved by the Invention

The above-mentioned Patent Document 1 discloses that the number of LEDs arranged on the bottom plate of the chassis in a planar arrangement is greater in the vicinity of the corners than in the middle portion. With such an arrangement, an increased number of LEDs emit light in the vicinity of the corners, and thus the shortage of the light amount at the corners is accordingly compensated.

However, the technique disclosed in the above-described Patent Document 1 results in an increase in the entire number of the LEDs used in the backlight unit, and thus the manufacturing cost thereof will be increased in accordance with the increase in the number of the LEDs. Further, in order to change the number of the LEDs depending on the positions of the LEDs in the chassis, LEDs are required to be arranged on an LED board in a disproportional manner, which requires a dedicated LED board. Accordingly, general-purpose LED boards on which the LEDs are equidistantly aligned are not usable, which will result in a further increase of the manufacturing cost.

DISCLOSURE OF THE PRESENT INVENTION

The present invention was made in view of the foregoing circumstances and an objective of the present invention is to restrict uneven brightness at low cost.

Means for Solving the Problem

A lighting device according to an aspect of the present invention includes: a light source; a chassis including a bottom plate provided on a side opposite to a light exit side with respect to the light source, the chassis housing the light source; and a reflection member configured to reflect light and including a quadrangular bottom portion and at least two raised portions. The bottom portion is arranged along the bottom plate and each of the at least two raised portions is raised from at least adjacent two sides of the bottom portion toward the light exit side, and each raised portion has a side edge and the tow raised portions form a joint between adjacent two side edges of the raised portions. In the lighting device, the at least two raised portions includes a one raised portion and another raised portion, and the one raised portion includes a facing portion on the side edge thereof so as to face the side edge of the other raised portion with respect to a direction directing from the bottom toward the one raised portion, and the one raised portion and the facing portion bulge toward the light output side.

According to this configuration, by reflecting the light from the light source with the reflection member including the bottom and the raised portions, the light efficiently exits. In the reflection member, the joint is provided between the adjacent side edges of the at least two raised portions raised toward the light exit side from the at least adjacent two sides of the quadrangular bottom. If the raised portions are warped and deformed in a direction opposite to the light exit side, a gap may be generated at the joint. The light may accordingly leak out through the gap, and thus a dark region may be locally generated. One of the solutions to such a problem is, for instance, to increase the number of LEDs in the vicinity of the joint. However, the increase in the number of LEDs leads to a cost increase.

According to the aspect of the present invention, the side edge of the one raised portion of the at least two raised portions is provided with the facing portion that faces the side edge of the other raised portion in the direction where the one raised portion is raised from the bottom, and the one raised portion and the facing portion bulge toward the light exit side. Therefore, the side edge of the other raised portion receives a stress that biases the other raised portion toward the light exit side from the facing portion that is provided to face the other raised portion. The stress applied from the facing portion restricts the other raised portion from being deformed in the direction opposite to the light exit side, and the other raised portion is less likely to be deformed. Accordingly, a gap is not generated at the joint between the side edge of the one raised portion and the side edge of the other raised portion. Thus, without increasing the number of the light source, the light is prevented from leaking out through the joint, and uneven brightness is suppressed at low cost.

In the aspect of the present invention, the following configuration(s) may be employed.

(1) The bottom may be elongated quadrangular, and the other raised portion may be raised from a short side of the bottom and the one raised portion including the facing portion may be raised from a long side of the bottom. In this configuration, if the longitudinal quadrangular bottom is thermally expanded due to changes in the heat environment, the bottom tends to be thermally expanded in the long-side direction in a greater amount than in the short-side direction. Thus, a raised basal position of the other raised portion raised from the short side is displaced in accordance with the thermal expansion of the bottom in the long-side direction, and the other raised portion is easily deformed. However, according to the aspect of the present invention, even if the thermal expansion occurs, the facing portion provided to the one raised portion raised from the long side restricts the other raised portion at the short side from being displaced in the direction opposite to the light exit side. This effectively prevents a gap from being generated at the joint and therefore the light is effectively prevented from leaking out through the gap.

(2) The other raised portion may be raised from each of paired short sides of the bottom and the one raised portion may be raised from each of paired long sides of the bottom, and the facing portion may be provided to each of two side edges of each of the paired one raised portions. With this configuration, each of the side edges of each of the one raised portions raised from the long sides adjacent to the short sides is provided with the facing portion, and each of the side edges of each of the paired other raised portions raised from the short sides are applied with the stress from the corresponding facing portion. Thus, the other raised portions are more reliably restricted from being displaced in the direction opposite to the light exit side. Accordingly, a gap is not generated at each of four joints provided between the adjacent side edges of the paired other raised portion and the paired one raised portions, and therefore uneven brightness is effectively suppressed.

(3) The paired other raised portions may be raised from the bottom at a raising angle substantially equal to a raising angle at which the paired one raised portions are raised from the bottom. With this configuration, the light reflected by each of the paired other raised portions is substantially equally angled. Likewise, the light reflected by each of the paired one raised portions is substantially equally angled. Accordingly, the reflection light reflected by the reflection member will exhibit less unevenness, and thus uneven brightness is further suppressed.

(4) The lighting device according to the aspect of the present invention may further include an optical member provided on a side close the light exit side with respect to the light source. In such a lighting device, at least the one raised portion may include an extending portion at a distal end thereof and that the extending portion may extend outwardly, and the chassis may include a receiving plate configured to sandwich the extending portion with the optical member. According to this configuration, for example, if the optical member is mounted to the receiving plate with the extending portion being separated from the receiving plate and the extending portion is held therebetween, the one raised portion is applied with a stress that biases the one raised portion toward the light exit side. Accordingly, the one raised portion and the facing portion bulge toward the light exit side, and the stress that biases the side edge of the other raised portion toward the light exit side is generated.

(5) The other raised portion may bulge toward the light exit side together with the one raised portion and the facing portion. With this configuration, the other raised portion bulge toward the light exit side by the stress from the facing portion, and this reliably restricts the other raised portion from being displaced in the direction opposite to the light exit side. Accordingly, a gap is less likely to be generated at the joint, and thus the leaking out of the light is effectively prevented.

(6) The bottom and the one raised portion may form a boundary that is bent with a crease and the one raised portion and the extending portion form a boundary that is curved without a crease. With this configuration in which the boundary between the one raised portion and the extending portion is curved without a crease, the one raised portion will receive a relatively greater stress when the extending portion is sandwiched between the optical member and the receiving plate, as compared to a configuration in which the boundary is bent at a crease provided to the same boundary. Thus, the stress applied from the facing portion to the side edge of the other raised portion is also increased, and therefore the other raised portion is more reliably restricted from being displaced in the direction opposite to the light exit side. Accordingly, a gap is less likely to be generated at the joint, and thus the leaking out of the light is effectively prevented.

(7) Out of the boundary between the bottom and the one raised portion and the boundary between the one raised portion and the extending portion, the boundary between the bottom and the one raised portion may be provided with a recess that facilitates forming of the crease. With this configuration, when the one raised portion is raised from the bottom, the crease is more easily formed by the recess at the boundary, and thus the one raised portion is easily formed into a desirable configuration. On the other hand, the boundary between the one raised portion and the extending portion is not provided with the recess, and therefore a crease is not formed easily. Thus, if the extending portion is sandwiched between the optical member and the receiving plate, the stress may be more reliably applied to the one raised portion.

(8) The other raised portion may include an extending portion at a distal end thereof and the extending portion may extend outward, and the bottom and the other raised portion form a boundary and the other raised portion and the extending portion form a boundary and the boundaries may be each provided with a recess that facilitates forming of the crease. With this configuration, when the other raised portion is raised from the bottom and when the extending portion is placed on the receiving plate, the creases are easily formed at the boundaries by the recesses. Accordingly, the configuration of the other raised portion may be stabilized, and the facing portion of the one raised portion may be more easily and reliably positioned to face the side edge of the other raised portion. Thus, the stress from the facing portion is more reliably applied to the other raised portion.

(9) The recess may include perforations arranged linearly at intervals. With this configuration, the recess (perforations) is formed at low cost at the time of manufacturing the reflection member.

(10) The facing portion may be provided to cover an entire length of the side edge of the one raised portion. With this configuration, the facing portion provided to cover the entire length of the side edge of the one raised portion may apply the stress to the other raised portion. Therefore, the other raised portion is more reliably restricted from being displaced in the direction opposite to the light exit side, and a gap is less likely to be generated at the joint.

(11) The raised portions may be inclined with respect to the bottom. With this configuration, the raised portions serve to reflect the light toward the light exit side at a favorable angle.

(12) The raised portions may be formed to be substantially linear. With this configuration, the raised portions serve to reflect the light toward the light exit side at a more favorable angle.

(13) The chassis may further include a side plate that stands from the bottom plate, and the side plate defines a space with the raised portions and faces the raised portions.

According to this configuration, since the space is ensured between the other raised portion and the side plate, the other raised portion may be adversely displaced as if receding into the space. However, the facing portion provided to the side edge of the one raised portion may effectively restrict the above displacement of the other raised portion, and thus the light is prevented from leaking through the joint.

(14) The light source may be an LED. With this configuration, high brightness, power saving and the like are achieved.

(15) The LED may include a plurality of LEDs, and the LEDs may be mounted on an LED board that extends parallel to the bottom plate and the bottom. In mounting the plurality of LEDs on the LED board, the LEDs need to be arranged on the LED board in a disproportional manner as has been done in a known technique so as to arrange the greater number of the LEDs in the vicinity of the joint. Thus, manufacturing of a dedicated LED board is required, which leads to a cost increase. However, by providing the facing portion to the side edge of the one raised portion of the reflection member, the employment of such a known technique is avoidable. Thus, for instance, general-purpose LED boards on which the LEDs are regularly aligned can be used. Accordingly, a further cost reduction is achieved.

(16) The lighting device according the aspect of the present invention may further include a diffusing lens provided on the light exit side relative to the LED and configured to diffuse light from the LED and exit the light therefrom. With this configuration, the light emitted from the LEDs is diffused by the diffusing lens and exited through the diffusing lens. Accordingly, the exited light exhibits less unevenness and the number of the LEDs is reduced, and this achieves a cost reduction.

(17) The lighting device according to the aspect of the present invention may further include an optical member provided on the light exit side relative to the light source. In such lighting device, the chassis may include a portion facing the optical member and the portion may be divided into a light-source arranged region in which the light source is arranged and an empty region in which no light source is arranged, and the optical member may include a portion that overlaps the light-source arranged region and a portion that overlaps the empty region, and the light reflectance may be higher on at least a surface of the portion overlapping the light-source arranged region facing the light source than on at least a surface of the portion overlapping the empty region. With this configuration, the light emitted from the light source first reaches the portion of the optical member that exhibits a relatively greater light reflectance, and most of the light is reflected (i.e., most of the light is not transmitted through the optical member). Thus, the brightness of the illumination light is suppressed with respect to the amount of the light emitted from the light source. On the other hand, the light reflected as above is reflected by the reflection member in the chassis to be directed to the empty region. The portion of the optical member overlapping the empty region exhibits a relatively smaller light reflectance and transmits a greater amount of the light. Thus, the illumination light having predetermined brightness is obtained.

(18) The chassis may include a portion facing the optical member and the portion may be divided into at least a first end portion, a second end portion located at an end opposite to the first end portion, and a middle portion provided between the first end portion and the second end portion. The middle portion may correspond to the light-source arranged region and the first end portion and the second end portion may correspond to the empty region. With this configuration, sufficient brightness is reliably ensured at the middle portion of the lighting device, and thus a display device including the lighting device also reliably obtains the brightness at a middle portion of the display. Therefore, good visibility is obtained.

(19) The light source may be a cold cathode tube. With this configuration, a longer lifetime is achieved, and dimming of light is executed easily.

(20) The light source may be a hot cathode tube. Accordingly, the enhancement of the brightness and the like are achieved.

For a solution of the above-described problem, a display device according to another aspect of the present invention includes: the above-described lighting device; and a display panel adapted to display with use of light from the lighting device.

With this configuration, the lighting device supplying the light to the display panel suppresses uneven brightness at low cost, and this achieves excellent display quality at low cost.

A liquid crystal panel may be used as the display panel may. The above-configured display device is applicable as a liquid crystal display device to several uses such as uses in display devices of television sets or personal computers. Specifically, the above-configured display device is more favorably applicable to uses in large-screen display devices.

Advantageous Effect of the Invention

According to the aspects of the present invention, uneven brightness is restricted at low cost.

BEST MODE FOR CARRYING OUT THE INVENTION

First Embodiment

Figure 1:
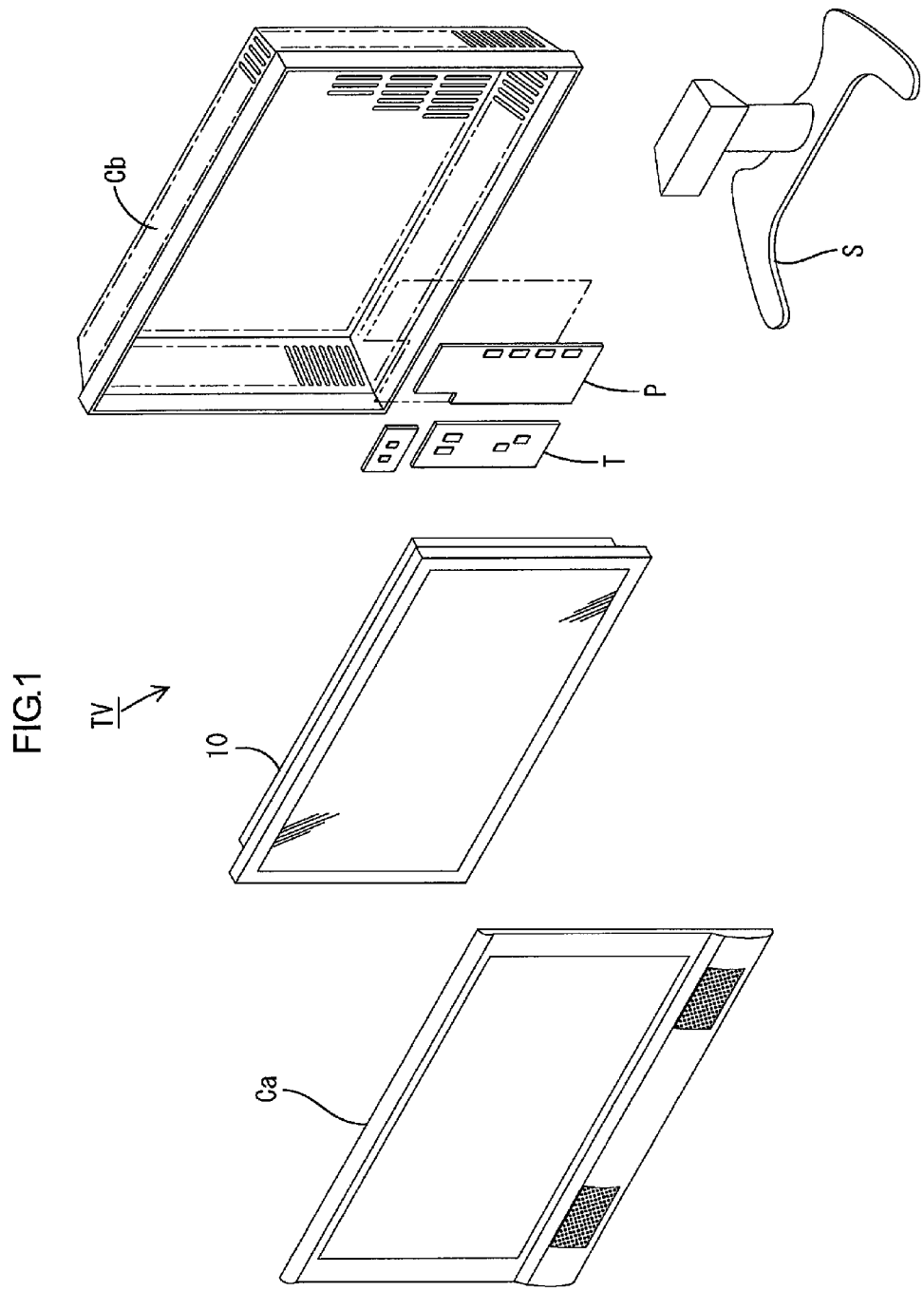
FIG. 1 is an exploded perspective view schematically depicting a television receiver of a first exemplary embodiment according to an aspect of the present invention.

A first exemplary embodiment according to an aspect of the present invention will be described with reference to FIGS. 1 to 20. In this exemplary embodiment, a liquid crystal display device 10 will be exemplarily described. Parts of the attached drawings indicate an X-axis, Y-axis and Z-axis, in which each axial direction coincides with the direction indicated in the drawings. The upper sides in FIGS. 3 and 4 will be a front side while the lower sides therein will be a rear side.

Figure 2:
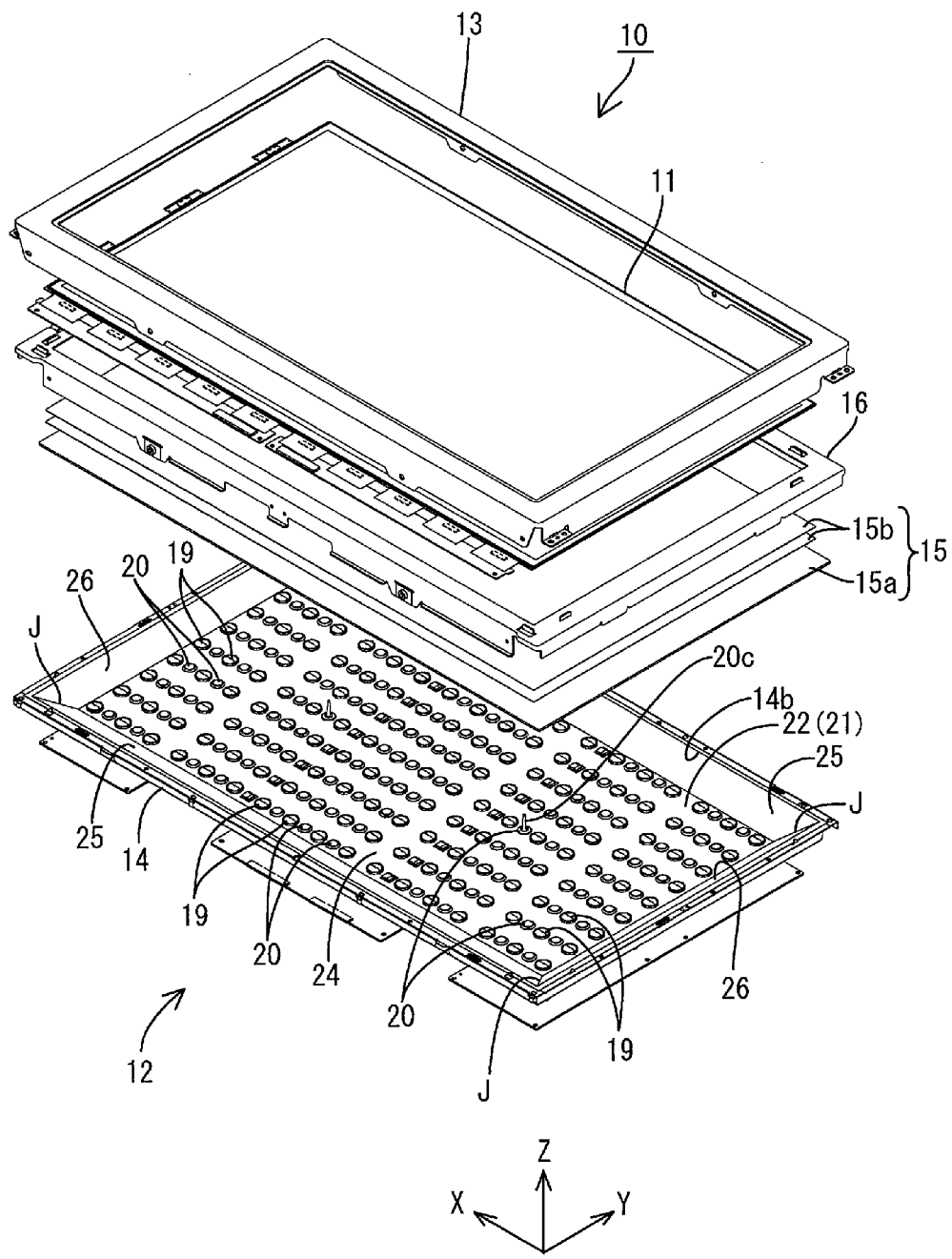
FIG. 2 is an exploded perspective view schematically depicting a liquid crystal display device included in the television receiver.

As depicted in FIG. 1, a television receiver TV according to this exemplary embodiment includes: the liquid crystal display device 10; front and rear cabinets Ca and Cb that sandwich the liquid crystal display device 10 to house the liquid crystal display device 10 therein; a power source P; a tuner T; and a stand S. The liquid crystal display device (display device) 10, which is in whole transversely (elongated) quadrangular (rectangular), is housed in a vertically standing posture. As depicted in FIG. 2, the liquid crystal display device 10 includes: a liquid crystal panel 11 serving as a display panel; and a backlight unit (lighting device) 12 serving as an external light source. A bezel 13, shaped like a frame, and other components hold and integrate the liquid crystal panel 11 and the backlight unit 12 together.

Now, the liquid crystal panel 11 and the backlight unit 12, which are included in the liquid crystal display device 10, will be sequentially described. The liquid crystal panel (display panel) 11, which is transversely quadrangular in a planar view, is configured such that a pair of glass substrates is joined together with a predetermined gap interposed therebetween and liquid crystal is enclosed in between the glass substrates. A first glass substrate is provided with: a switching component (e.g., TFT) connected to a source wiring and a gate wiring orthogonal to each other; a pixel electrode connected to the switching component; and further an alignment film and the like. On the other hand, a second glass substrate is provided with: a color filter in which color sections such as R (red), G (green) and B (blue) sections are disposed in a predetermined alignment; counter electrodes; and further an alignment film and the like. A polarizing plate is provided outside of the two glass substrates.

Then next, the backlight unit 12 will be described in detail. As depicted in FIG. 2, the backlight unit 12 includes: a substantially box-shaped chassis 14 having an opening 14b at a light exiting side (side of liquid crystal panel 11); a group of an optical member 15 (a diffuser plate (light diffuser member) 15a and a plurality of optical sheets 15b provided between the diffuser plate 15a and the liquid crystal panel 11) provided to cover the opening 14b of the chassis 14; and a frame 16 disposed to follow an outer periphery of the chassis 14 and hold an outer periphery of the group of the optical member 15 by sandwiching with the chassis 14 the outer periphery of the group of the optical member 15. In addition, interior of the chassis 14 includes: an LED (light emitting diodes) 17 serving as a light source; an LED board 18 mounted with the LED 17; and a diffusing lens 19 attached to the LED board 18 at a position corresponding to the LED 17. The interior of the chassis 14 further includes: a holding member 20 adapted to hold with the chassis 14 the LED board 18; and a reflection sheet 21 that reflects the light in the chassis 14 to the optical member 15. In the backlight unit 12, a side closer to the optical member 15 relative to the LED 17 serves as the light exiting side. In the following description, components of the backlight unit 12 will be described in detail.

Figure 3:
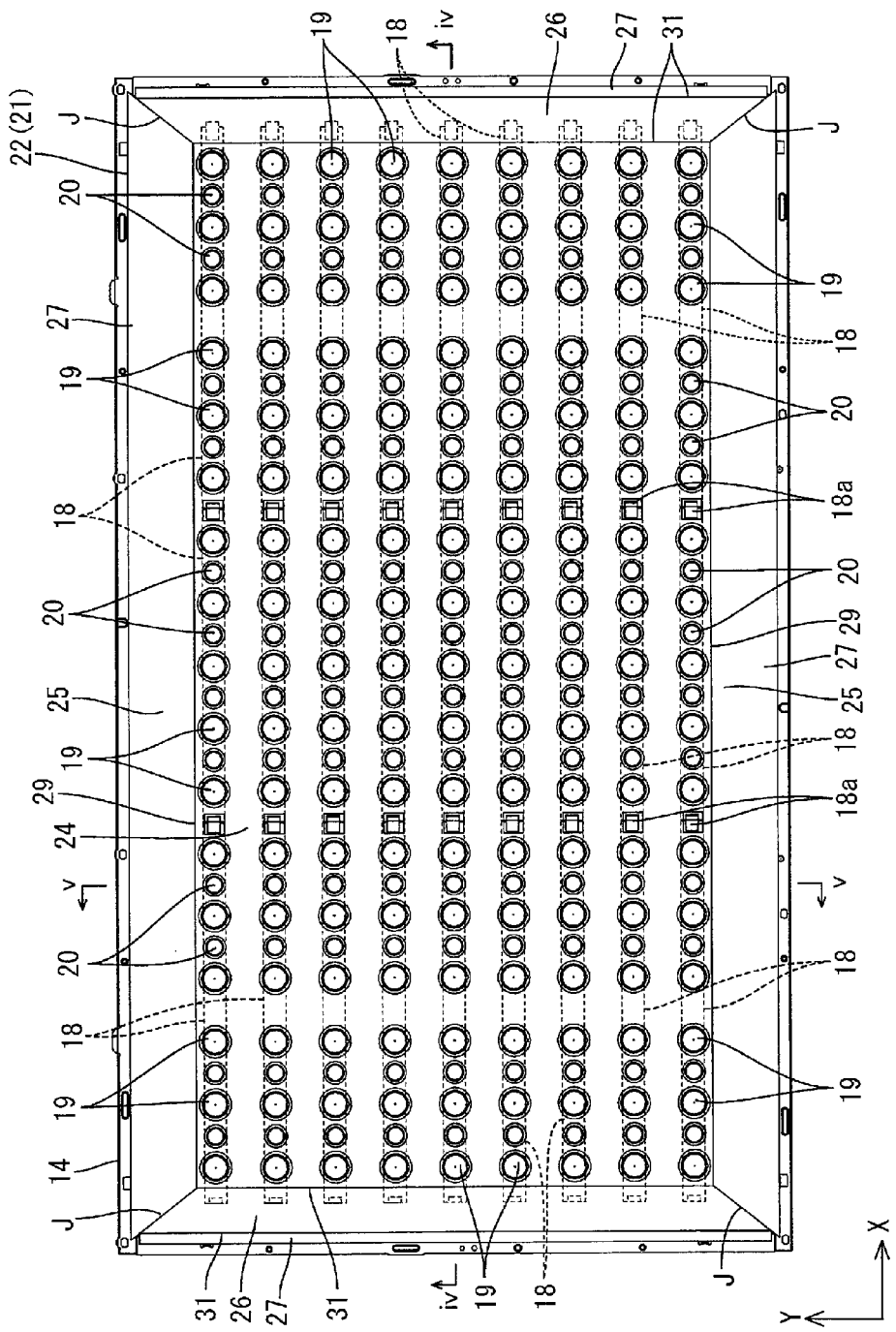
FIG. 3 is a top view depicting a layout of LED boards, a first reflection sheet and holding members in a chassis of the liquid crystal display device.
Figure 4:
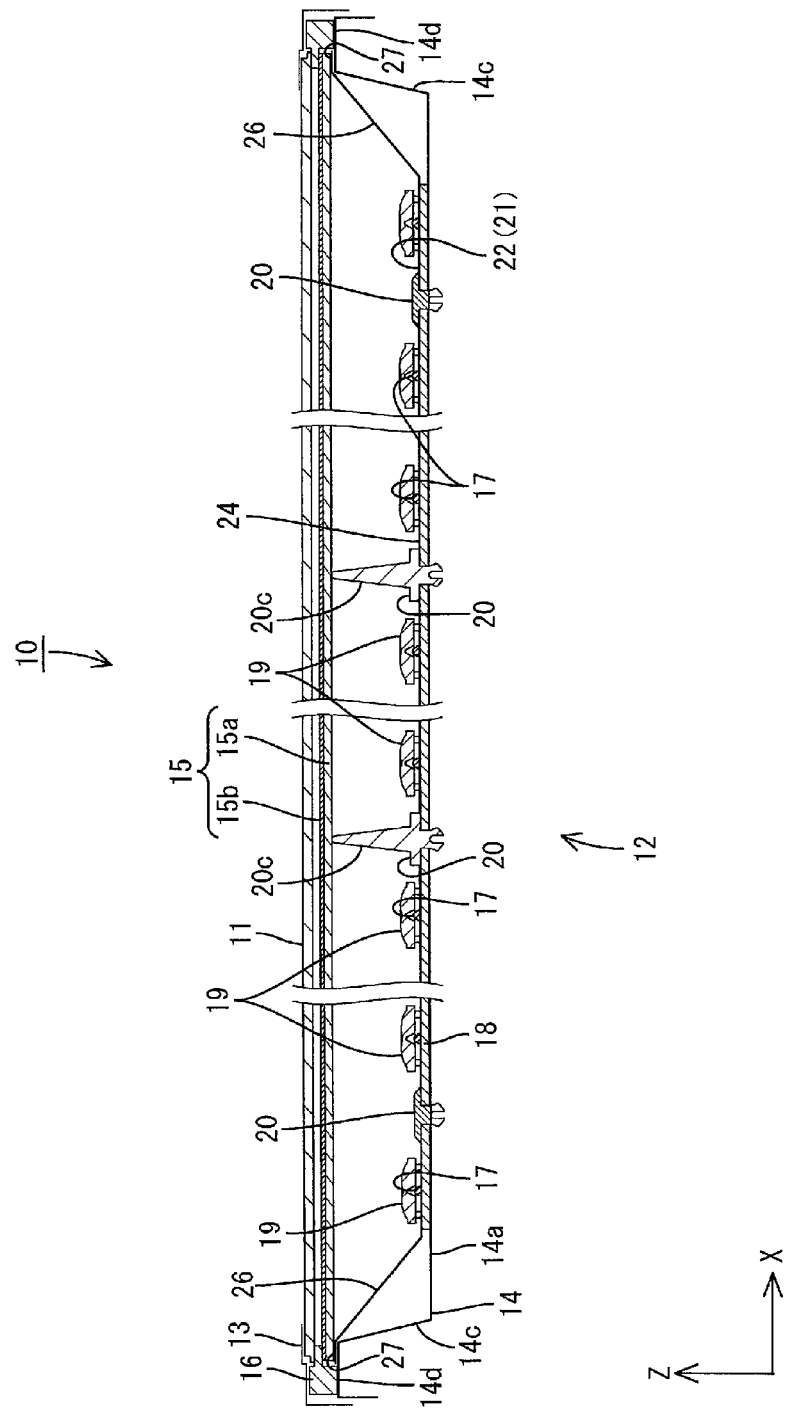
FIG. 4 depicts a cross section of the liquid crystal display device in FIG. 3 taken along the segment iv to iv.
Figure 5:
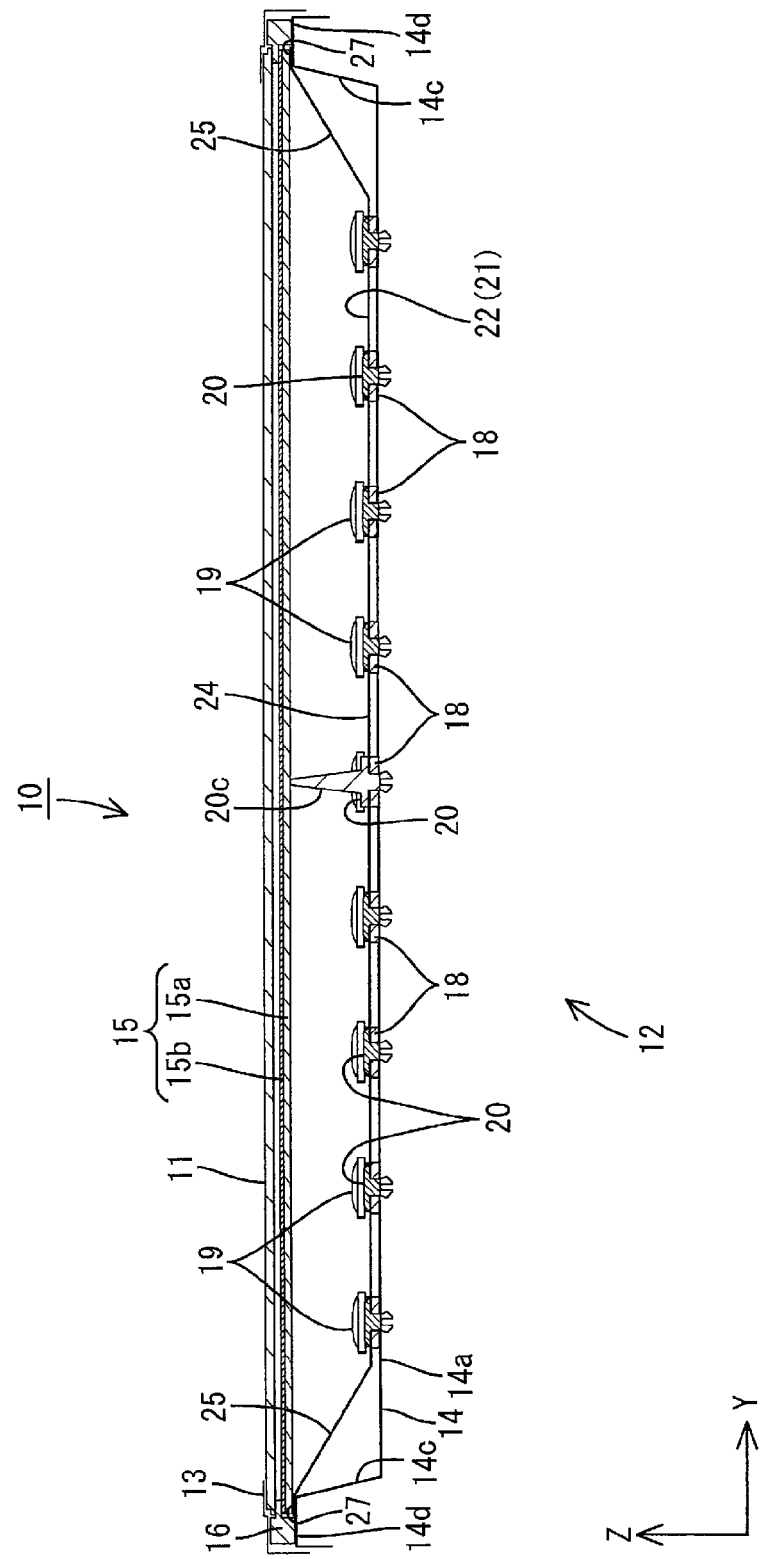
FIG. 5 depicts a cross section of the liquid crystal display device in FIG. 3 taken along the segment v to v.

As depicted in FIGS. 3 to 5, the chassis 14, which is exemplarily made of metal, includes: a bottom plate 14a that is transversely quadrangular (rectangular) similarly to the liquid crystal panel 11; a lateral plate 14c that stands from outer ends of sides (a pair of long sides and a pair of short sides) of the bottom plate 14a toward the front side (light exiting side); and a receiving plate 14d that extends outward from a standing end of the lateral plate 14c. In its entirety, the chassis 14 has a substantially shallow box shape (substantially shallow dish shape) that is opened toward the front side. The long sides of the chassis 14 extend in the same direction as the X-axis direction (transverse direction) while the short sides thereof extend in the same direction as the Y-axis direction (vertical direction). The receiving plate 14d of the chassis 14 is adapted to be mounted with the frame 16 and the optical member 15 (described below) from the front side. The frame 16 is mounted to the receiving plate 14d with screws. The bottom plate 14a of the chassis 14 is provided with an attachment hole 14e adapted to be attached with the holding member 20. The attachment hole 14e is configured such that a plurality of attachment holes 14e is provided to the bottom plate 14a respectively at positions corresponding to attachment positions of the holding members 20.

Figure 7:
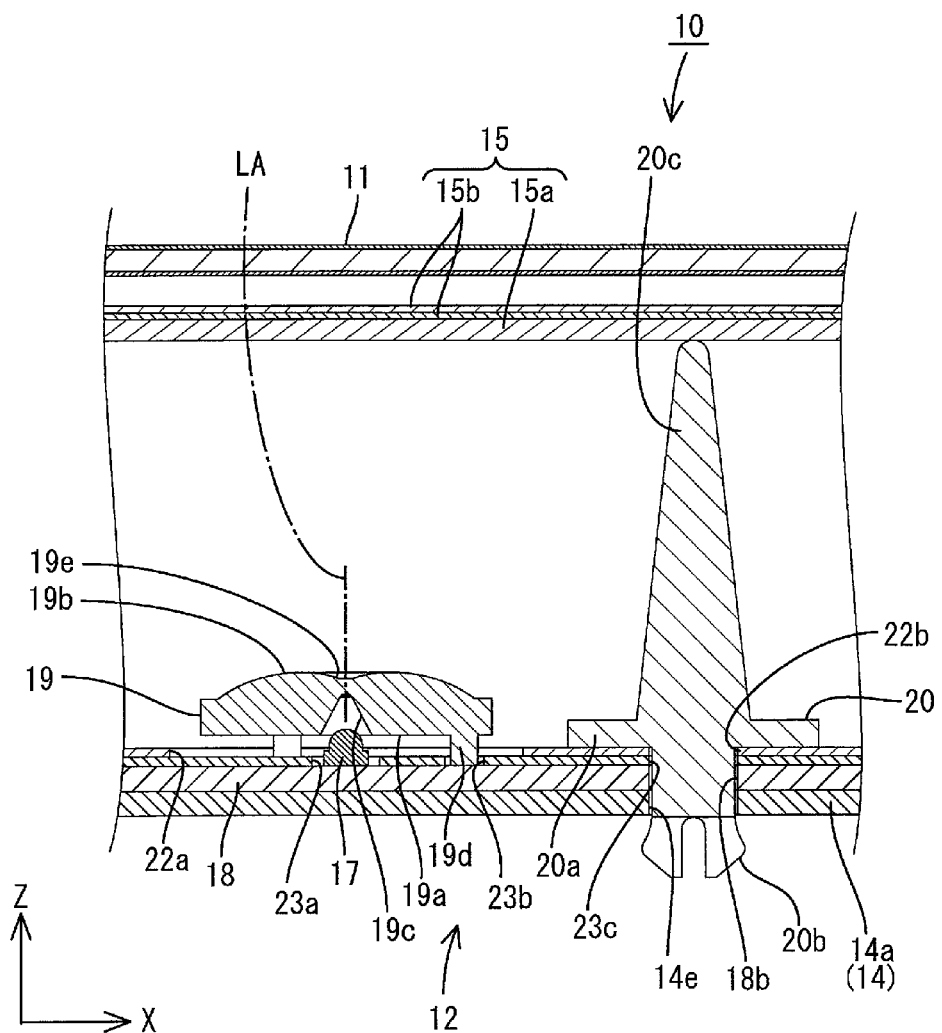
FIG. 7 depicts a cross section of FIG. 6 taken along the segment vii to vii.
Figure 8:
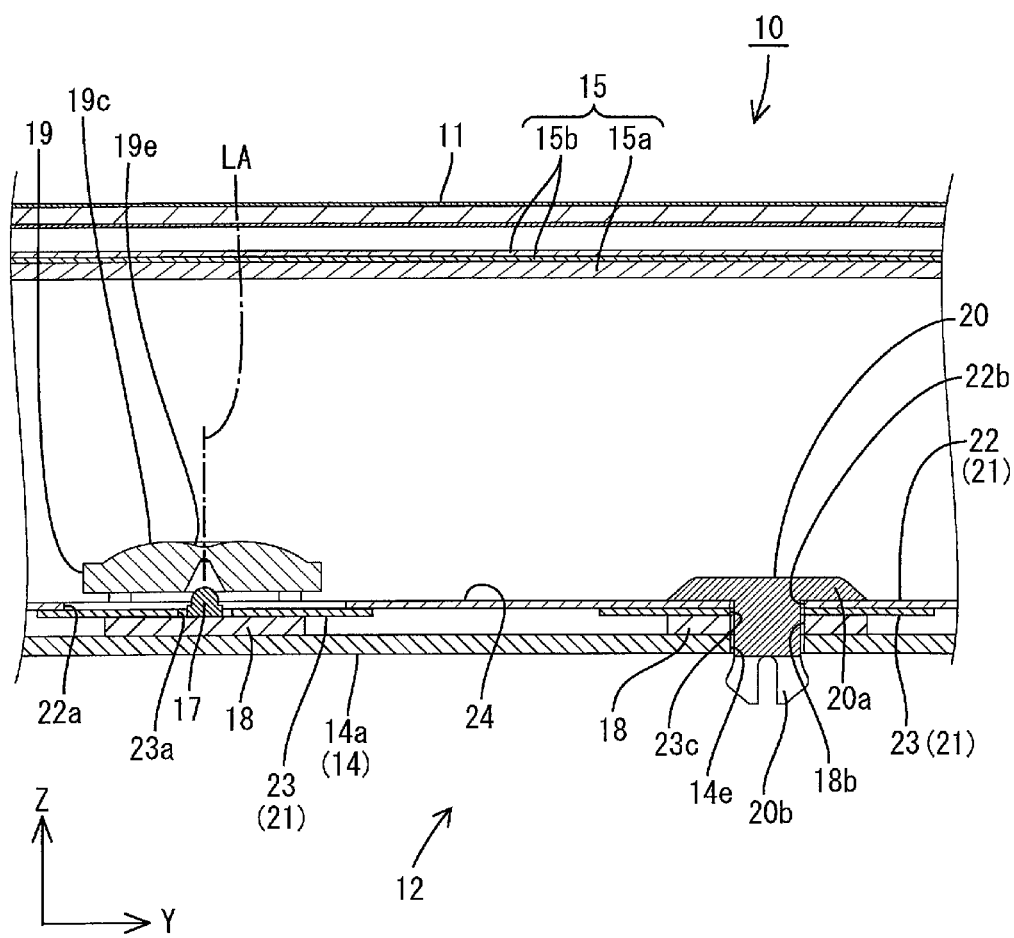
FIG. 8 depicts a cross section of FIG. 6 taken along the segment viii to viii.

As depicted in FIG. 2, the optical member 15 is also transversely quadrangular (rectangular) in a planar view, like the liquid crystal panel 11 and the chassis 14. As depicted in FIG. 3, by mounting the outer periphery of the optical member 15 on the receiving plate 14d, the optical member 15 covers the opening 14b of the chassis 14 while being interposed between the liquid crystal panel 11 and the LED 17. The optical member 15 includes: the diffuser plate 15a positioned at the rear side (side of the LED 17, i.e., opposite to the light exiting side); and the optical sheets 15b positioned at the front side (side of the liquid crystal panel 11, i.e., the light exiting side). The diffuser plate 15a, which is configured such that a number of diffusing particles is dispersed in a substantially transparent resin base substrate having a predetermined thickness, is adapted to diffuse the light transmitted through the diffuser plate 15a. The optical sheets 15b are sheets having smaller thickness than the diffuser plate 15a. In FIGS. 7 and 8, two optical sheets 15b are layered. Examples of the optical sheets 15b are diffuser sheets, lens sheets and reflection type polarizing sheets. In use, the optical sheets 15b may be selected from the above examples as needed.

As depicted in FIG. 2, the frame 16 is a frame that conforms to outer circumferences of the liquid crystal panel 11 and the optical member 15. The frame 16 is adapted to sandwich with the receiving plate 14d the outer periphery of the optical member 15 (see, FIGS. 4 and 5). Furthermore, the frame 16 is also adapted to be mounted with an outer periphery of the liquid crystal panel 11 from the rear side, such that the outer periphery of the liquid crystal panel 11 is sandwiched between the frame 16 and the bezel 13 mounted to the liquid crystal panel 11 from the front side (see, FIGS. 4 and 5).

Now, the LED 17 and the LED board 18 mounted with the LED 17 will be described. As depicted in FIGS. 7 and 8, the LED 17 is structured such that a LED chip is, with a resin material, sealed onto a substrate fixed to the LED board 18. The LED chip mounted on the substrate emits light of one main emission wavelength. Specifically, an LED chip that emits monochromatic light of blue color is in use. On the other hand, the resin material adapted to seal the LED chip is blended with fluorescent substance such that the fluorescent substance is dispersed in the resin material. The fluorescent substance converts the blue light emitted by the LED chip into white light. With this arrangement, the LED 17 is configured to emit white light. The LED 17 is a so-called top-emitting device whose emitting surface is opposite to the surface mounted to the LED board 18 (the emitting surface facing the optical member 15).

As depicted in FIGS. 3 and 4, the LED board 18 has a base substrate transversely quadrangular in a planar view. The long sides of the LED board 18 extend in the same direction as the X-axis direction while the short sides thereof extend in the same direction as the Y-axis direction. With the above orientation, the LED board 18 is housed in the chassis 14 to extend along the bottom plate 14a. The base member of the LED board 18 is, like the chassis 14, made of metal such as an aluminum-based material. A front surface of the LED board 18 is provided with a wiring pattern made of metal film such as copper foil with an interposition of an insulating layer. Alternatively, the base member of the LED board 18 may be made of an insulating material such as ceramic. A front surface (the surface facing the optical member 15) of the base member of the LED board 18 is surface-mounted with the LED 17 configured as above. The LED 17 is configured such that a plurality of LEDs 17 is juxtaposed linearly along the long-side direction (X-axis direction) of the LED board 18, and connected serially with one another by the wiring pattern of the LED board 18. Arrangement pitches of the LEDs 17 are substantially constant. In other words, the LEDs 17 are equidistantly arranged. In addition, both longitudinal ends of the LED board 18 are provided with connectors 18a.

As depicted in FIG. 3, the above-described LED board 18 is configured such that a plurality of LED boards 18 is juxtaposed both in the X-axis and Y-axis directions within the chassis 14, with their long and short sides aligned respectively in the same directions. In other words, the LED boards 18 and the LEDs 17 mounted thereon are both disposed in the chassis 14 to form a matrix (disposed in a plane arrangement), in which the X-axis direction (direction along the long sides of the chassis 14 and the LED boards 18) is coincident with the row direction of the matrix while the Y-axis direction (direction along the short sides of the chassis 14 and the LED boards 18) is coincident with the column direction of the matrix. Specifically, in the chassis 14, three LED boards 18 in the X-axis direction and nine LED boards 18 in the Y-axis direction are aligned in juxtaposition, whereby twenty seven LED boards 18 in total are aligned in juxtaposition therein. The LED boards 18 that are juxtaposed in the X-axis direction to form a row are electrically connected with one another by fittably connecting adjacent pairs of connectors 18a. In addition, the connectors 18a positioned to correspond to both X-axial ends of the chassis 14 are electrically connected to an outer control circuit (not depicted). With the above arrangement, the LEDs 17 disposed on the single-row forming LED boards 18 are serially connected with one another, and the great number of LEDs 17 included in the single row is, with use of a single control circuit, controllably switched on and off in a lump sum manner. Thus, a cost reduction is achievable. In addition, the arrangement pitches of the LED boards 18 aligned in the Y-axis direction are substantially equal. Accordingly, the LEDs 14 disposed in a plane arrangement along the bottom plate 14a in the chassis 14 are substantially equidistantly juxtaposed both in the X-axis direction and the Y-axis direction.

Figure 6:
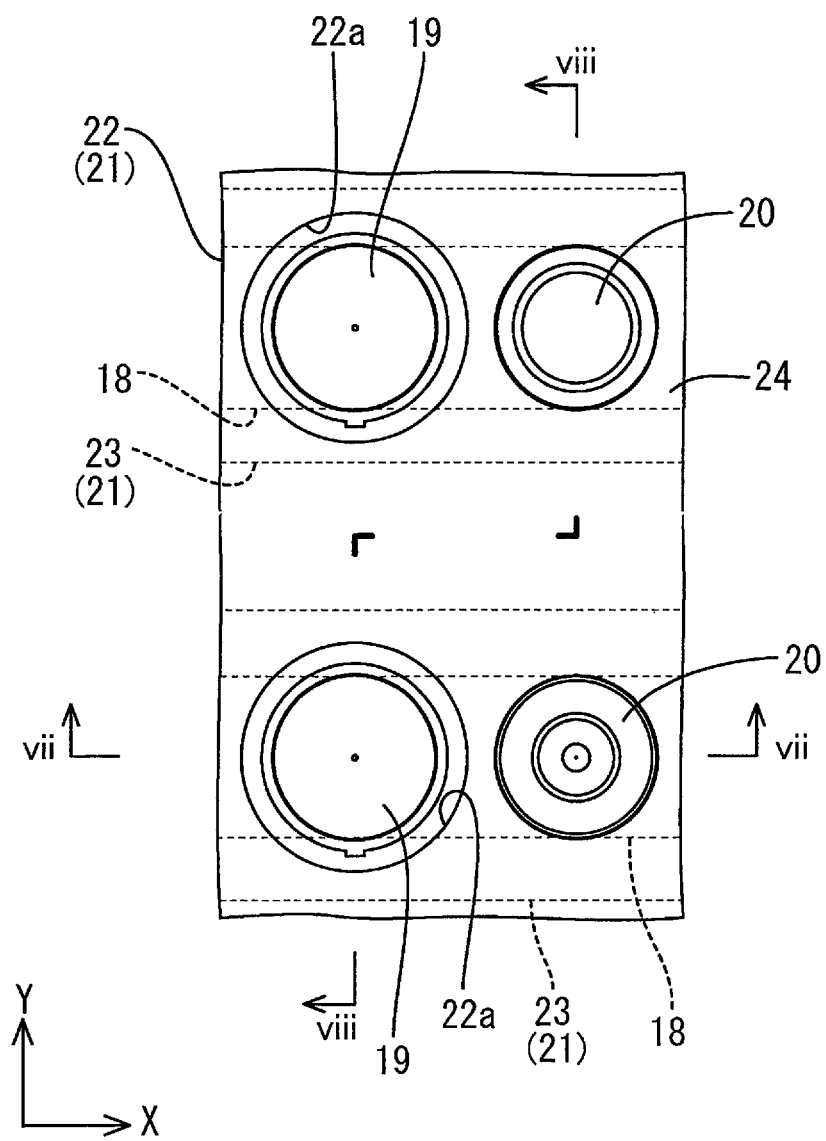
FIG. 6 is a top view depicting a detailed layout of the LED boards and the holding members.

The diffusing lens 19 is made of a substantially transparent (capable of high light transmission) synthetic resin material having a higher refraction index than air (such as polycarbonate or acrylic). As depicted in FIGS. 6 to 8, the diffusing lens 19, which has a predetermined thickness, is substantially circular in a planar view. The diffusing lens 19 is attached to the LED board 18 to cover the LED 17 discretely from the front side (i.e., be superposed over the LED in a planar view). The diffusing lens 19 is adapted to diffuse highly directional light emitted by the LED 17 and let out the light. In other words, the light emitted by the LED 17 reduces its directionality while passing through the diffusing lens 19. Thus, even when the distance between adjacent LEDs 17 is increased, regions between the adjacent LEDs 17 are less visibly recognized as dark regions. With this arrangement, the number of the LEDs is reducible. The diffusing lens 19 is positioned substantially concentrically with the LED 17 in a planar view.

In the diffusing lens 19, a surface facing rearward to oppose to the LED board 18 (LED 17) provides a light incident surface 19a through which the light from the LED 17 is incident, while a surface facing frontward to oppose to the optical member 15 provides a light exiting surface 19b through which the light is let out. As depicted in FIGS. 7 and 8, the light incident surface 19a, in a whole, follows the plate surface of the LED board 18 (in X-axis and Y-axis directions). However, a light-incident recess 19c provided to the light incident surface 19a at a position to be superposed over the LED 17 in a planar view provides a tilted surface tilted with respect to the optic axis LA of the LED 17. The light-incident recess 19c is substantially conical with an inverted-V shaped cross section, and positioned substantially concentrically with the diffusing lens 19. The light emitted from the LED 17 and entering the light-incident recess 19c is refracted by the tilted surface at a wide angle to be incident on the diffusing lens 19. In addition, an attachment leg 19d adapted to be attached to the LED board 18 protrudes from the light incident surface 19a. The light exiting surface 19b, which is substantially flatly spherical, is adapted to refract at a wide angle the light let out from the diffusing lens 19, and let out the light therethrough. The light exiting surface 19b has substantially bowl-shaped light exiting recess 19e at a position to be superposed over the LED 17 in a planar view. With the light exiting recess 19e, much of the light from the LED 17 is configured to be refracted and let out at a wide angle, or the light from the LED 17 is partially reflected to the LED board 18.

Then next, the holding member 20 will be described. The holding member 20 is made of synthetic resin such as polycarbonate, and a surface thereof is white, which is excellent in terms of light reflectance. As depicted in FIGS. 6 to 8, the holding member 20 includes: a body 20a that follows the plate surface of the LED board 18; and a fixed portion 20b that protrudes from the body 20a to the rear side (i.e., to the chassis 14) to be fixed to the chassis 14. The body 20a, having a substantially circular plate shape in a planar view, is adapted to sandwich with the bottom plate 14a of the chassis 14 the LED board 18 and the later-described reflection sheet 21. The fixed portion 20b is to be locked with the bottom plate 14a of the chassis 14 by penetrating through an insertion hole 18b and the attachment hole 14e. The through insertion hole 18b and the attachment hole 14e are respectively provided to the LED board 18 and the bottom plate 14a at positions corresponding to the attachment positions of the holding member 20. As depicted in FIG. 3, the holding member 20 is configured such that a great number of holding members 20 is juxtaposed within the planes of the LED boards 18 to form a matrix. Specifically, the holding members 20 are positioned between pairs of diffusing lenses 19 (LEDs 17) that are adjacent to each other in the X-axis direction.

As depicted in FIGS. 2 to 4, out of the holding members 20, a pair of holding members 20 positioned near the middle of the screen is provided with supports 20c that protrude from bodies 20a toward the front side to support the diffuser plate 15a from the rear side by the supports 20c. With this arrangement, the LEDs 17 and the optical member 15 are configured to keep constant their positional relationship in respect of the Z-axis direction, and thus an inadvertent deformation of the optical member 15 is prevented.

Now, the reflection sheet 21 is described. The reflection sheet 21 includes: a first reflection sheet 22 sized to cover substantially the entirety of the inner surface of the chassis 14; and a second reflection sheet 23 sized to cover LED board 18 discretely. The reflection sheets 22 and 23 are both made of synthetic resin, and surfaces thereof are white, which is excellent in terms of light reflectance. The reflection sheets 22 and 23 are both adapted to extend along the bottom plate 14a (LED boards 18) within the chassis 14.

Initially, the second reflection sheet 23 will be described. As depicted in FIGS. 6 to 8, the second reflection sheet 23, like the LED boards 18 to which the second reflection sheet 23 is applied, is transversely quadrangular in a planar view, and adapted to cover substantially the entirety of the LED boards 18 from the front side. The second reflection sheet 23 is superposed over the front surfaces of the LED boards 18, and thus positioned to face the diffusing lenses 19. In other words, the second reflection sheet 23 is interposed between the diffusing lenses 19 and the LED boards 18. Accordingly, the second reflection sheet 23 serves to re-reflect to the diffusing lenses 19 light returned from the diffusing lenses 19 to the LED boards 18, and also light incident from the outside of the diffusing lenses 19 into the gap between the diffusing lenses 19 and the LED boards 18 in a planar view. With this arrangement, use efficiency of light is enhanced, and thus brightness is enhanced. In other words, even when the number of LEDs 17 is reduced for a cost reduction, sufficient brightness is achievable.

As depicted in FIG. 8, short sides of the second reflection sheet 23 are sized to be larger than those of the LED boards 18 and diameters of the diffusing lenses 19 and lens insertion holes 22a of the later-described first reflection sheet 22. Accordingly, peripheries of the lens insertion holes 22a are positioned on a front surface of the second reflection sheet 23 by layering the first reflection sheet 22 on the front surface of the second reflection sheet 23. With this arrangement, the first reflection sheet 22 and the second reflection sheet 23 seamlessly and continuously extend in the chassis 14 in a planar view, and the chassis 14 or the LED boards 18 are hardly exposed to the front side through the lens insertion holes 22a. Accordingly, this arrangement efficiently reflects the light within the chassis 14 toward the optical member 15, which prominently enhances the brightness. The second reflection sheet 23 has: LED insertion holes 23a through which the LEDs 17 penetrate; leg insertion holes 23b through which the attachment legs 19d of the diffusing lenses 19 penetrate; and insertion holes 23c through which the fixed portions 20b of the holding members 20 penetrate. The LED insertion holes 23a, the leg insertion holes 23b and the insertion holes 23c are bored in the second reflection sheet 23 at positions respectively to be superposed over the LEDs 17, the attachment legs 19d and the fixed portions 20b in a planar view.

Then next, the first reflection sheet 22 will be described in detail. As depicted in FIG. 3, a most part of the first reflection sheet 22, which extends along the bottom plate 14a of the chassis 14, provides a bottom 24. The bottom 24 is transversely (elongated) quadrangular (rectangular), like the bottom plate 14a of the chassis 14. Long sides of the bottom 24 extend in the same direction as the X-axis direction while short sides thereof extend in the same direction as the Y-axis direction. The bottom 24 has the lens insertion holes 22a through which not only the LEDs 17 disposed in the chassis 14 but also the diffusing lenses 19 covering the LEDs 17 are inserted. Within the bottom 24, the plurality of lens insertion holes 22a is provided in juxtaposition at positions to be superposed over the LEDs 17 and the diffusing lenses 19 in a planar view, thereby forming a matrix. As depicted in FIG. 6, the lens insertion holes 22a are circular in a planar view, and their diameters are sized to be larger than the diameters of the diffusing lenses 19. With this arrangement, when laying the first reflection sheet 22 in the chassis 14, the diffusing lenses 19 may reliably penetrate through the lens insertion holes 22a, irrespective of dimension errors. As depicted in FIG. 3, the first reflection sheet 22 covers regions interposed between adjacent pairs of diffusing lenses 19 and outer circumferential regions of the diffusing lenses 19 in the chassis 14. Thus, the first reflection sheet 22 serves to reflect light directed to these regions toward the optical member 15. Further, the bottom 24 of the first reflection sheet 22 has insertion holes 22b through which the fixed portion 20b of the holding members 20 penetrate. The insertion holes 22b are bored in the bottom 24 at positions to be superposed over the fixed portions 20b in a planar view.

As depicted in FIGS. 3 to 5, first raised portions (one raised portion) 25 are raised from the pair of long sides of the bottom 24 of the first reflection sheet 22 toward the front side (i.e., the light exit side), while second raised portions (another raised portion) 26 are raised from the pair of short sides thereof toward the front side (i.e., the light exit side). The first raised portions 25 protrude outward in the Y-axis direction from the long sides of the bottom 24 in a planar view. In other words, the pair of first raised portions 25 is positioned to interpose the bottom 24 therebetween in respect of the Y-axis direction. The second raised portions 26 protrude outward in the X-axis direction from the short sides of the bottom 24 in a planar view. In other words, the pair of second raised portions 26 is positioned to interpose the bottom 24 therebetween in respect of the X-axis direction. The long sides of the bottom 24 are adjacent to the pair of short sides, while the short sides thereof are adjacent to the pair of long sides. Accordingly, the first raised portions 25 raised from the long sides of the bottom 24 are adjacent to the pair of second raised portions 26, while the second raised portions 26 raised from the short sides of the bottom 24 are adjacent to the pair of the first raised portions 25. A direction in which the first raised portions 25 are raised from the bottom 24 coincides with the Y-axis direction. On the other hand, a direction in which the second raised portions 26 are raised from the bottom 24 coincides with the X-axis direction. In the first reflection sheet 22, both of the first and second raised portions 25 and 26 extend outward from the center (inside) of the first reflection sheet 22. In addition, raised distal ends of the raised portions 25 and 26 are provided with extensions 27 that extend outward. The extensions 27 are mounted to the receiving plate 14d of the chassis 14, and sandwiched between the receiving plate 14d and the diffuser plate 15a.

Figure 9:
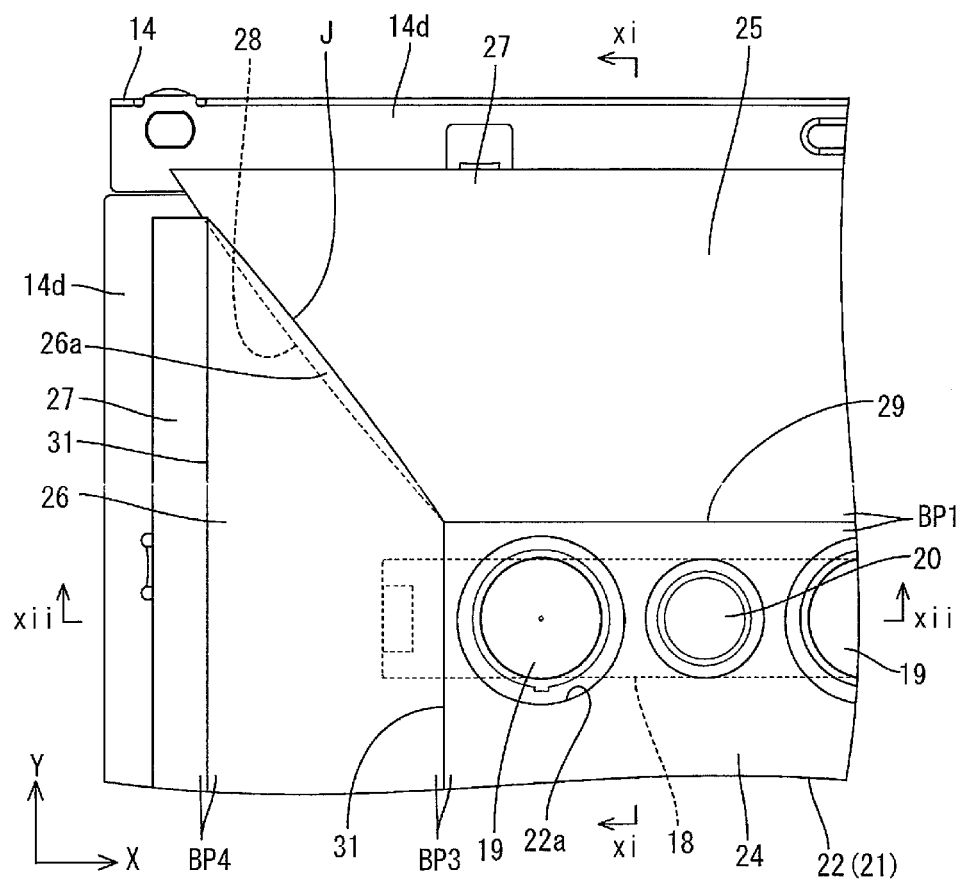
FIG. 9 is an enlarged top view depicting a corner of the chassis when the bent first reflection sheet is mounted on the chassis and a diffuser plate is attached.

The first raised portions 25 and the second raised portions 26 are substantially linearly tapered from the bottom 24 at a predetermined raising angle. Thus, the first reflection sheet 22 is, in its entirety, substantially bowl shaped. The raising angles at which the pair of first raised portions 25 is raised from the bottom 24 (i.e., the angles formed by the pair of first raised portions 25 with respect to the bottom 24) are substantially equal. Likewise, the raising angles at which the pair of second raised portions 26 is raised from the bottom 24 (i.e., the angles formed by the pair of second raised portions 26 with respect to the bottom 24) are substantially equal. With this arrangement, the angles given to the reflection light by the first raised portions 25 become substantially equal while the angles given to the reflection light by the second raised portions 26 also become substantially equal, which favorably restricts uneven brightness. Side edges 25a and side edges 26a respectively of the first raised portions 25 and the second raised portions 26 that are adjacent to each other are abutted on one another to provide joints J. The joints J are formed between the side edges 25a and 26a of the adjacent raised portions 25 and 26 respectively, and thus positioned at four corners of the first reflection sheet 22 (FIG. 3). As depicted in FIG. 9, the joints J are inclined with respect to both the X-axis and Y-axis directions in a planar view. In other words, the joints J follow the side edges 25a and 26b of the adjacent raised portions 25 and 26 respectively. Further, the raised portions 25 and 26, and the lateral plate 14c and the bottom plate 14a of the chassis 14 define a substantially triangular space S in a side view, the oblique line of which coincides with the tapering of the tapered raised portions 25 and 26 (see, FIGS. 4 and 5).

Figure 13:
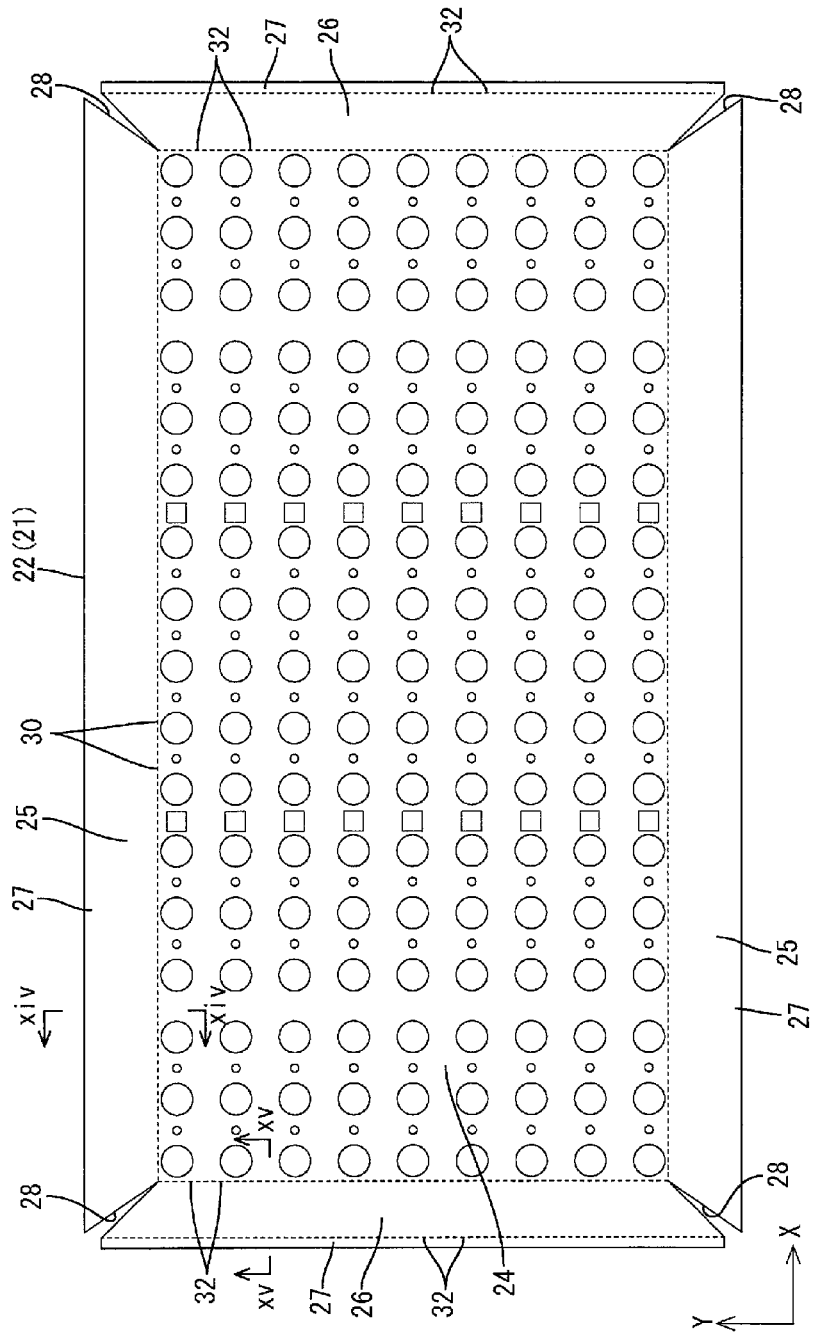
FIG. 13 is a top view depicting the spread first reflection sheet.

The first reflection sheet 22 is shaped as above by bending at predetermined positions a spread sheet punched out from a large-sized base material (not depicted) during the manufacturing process. As depicted in FIG. 13, while the first reflection sheet 22 remains to be a spread sheet, the first raised portions 25 and the second raised portions 26 are substantially trapezoidal in a planar view. The upper bases (shorter sides) thereof are positioned inward, and each side of the bottom 24 is continued from the upper bases, while the lower bases (longer sides) are positioned outward, and the extensions 27 are continued from the lower bases. While in the above spread sheet, the side edges 25a and 26a of the first raised portions 25 and the second raised portions 26 respectively are inclined with respect to both of the X-axis and Y-axis directions in a planar view. While in the above spread sheet, a predetermined clearance is provided between the side edges 25a and 26a of the neighboring first raised portions 25 and the second raised portions 26 respectively. The clearance is increased gradually from a raised base end (inner side) toward a raised distal end (outer side), to be substantially triangular in a planar view. In addition, the first raised portions 25 are symmetrical with respect to a segment passing through their centers in the Y-axis direction while the second raised portions 26 are symmetrical with respect to a segment passing through theirs center in the X-axis direction.

Out of the components of the backlight unit 12, the first reflection sheet 22 is a large-sized and highly thermally expandable component made of synthetic resin. Thus, the first reflection sheet 22 tends to be expanded or contracted in a great amount due to thermal expansion or contraction. Inter alia, the bottom 24 of the first reflection sheet 22 is expanded or contracted in a direction along its long sides (the X-axis direction) in a greater amount than in a direction along its short sides (the Y-axis direction) due to thermal expansion or contraction. In accordance therewith, positions of the raised base ends of the second raised portions 26, at which the second raised portions 26 are raised from the short sides of the bottom 24, are comparatively more greatly displaced than those of the first raised portions 25 raised from the long sides thereof. On the other hand, positions of the raised distal ends of the second raised portions 26 are substantially fixed, with the extensions 27 continued therefrom sandwiched between the receiving plate 14d and the diffuser plate 15a. Therefore, when the first reflection sheet 22 is thermally expanded, the positions of the raised base ends of the second raised portions 26 can be greatly displaced outward in the X-axis direction to come toward the raised distal ends, and in accordance therewith, the distance between the positions of the raised base ends and the positions of the raised distal ends will be greatly reduced, thereby generating a great deflection. With such a great deflection, the raised base ends of the second raised portions 26 can be displaced as if pulled toward the rear side (opposite to the light exiting side), and the second raised portions 26 can be deformed. When the above deflective deformation is generated to the second raised portions 26, the side edges 26a thereof are displaced to be away from the side edges 25a of the first raised portions 25, which brings a clearance to the joints J. When the clearance is brought to the joints J, the light is not reflected at the position of the clearance, and is leaked out of the first reflection sheet 22. Therefore, in the light exiting surface of the entire backlight unit 12, dark regions can be generated locally at the four corners thereof where the joints J are positioned, thereby causing uneven brightness.

Figure 10:
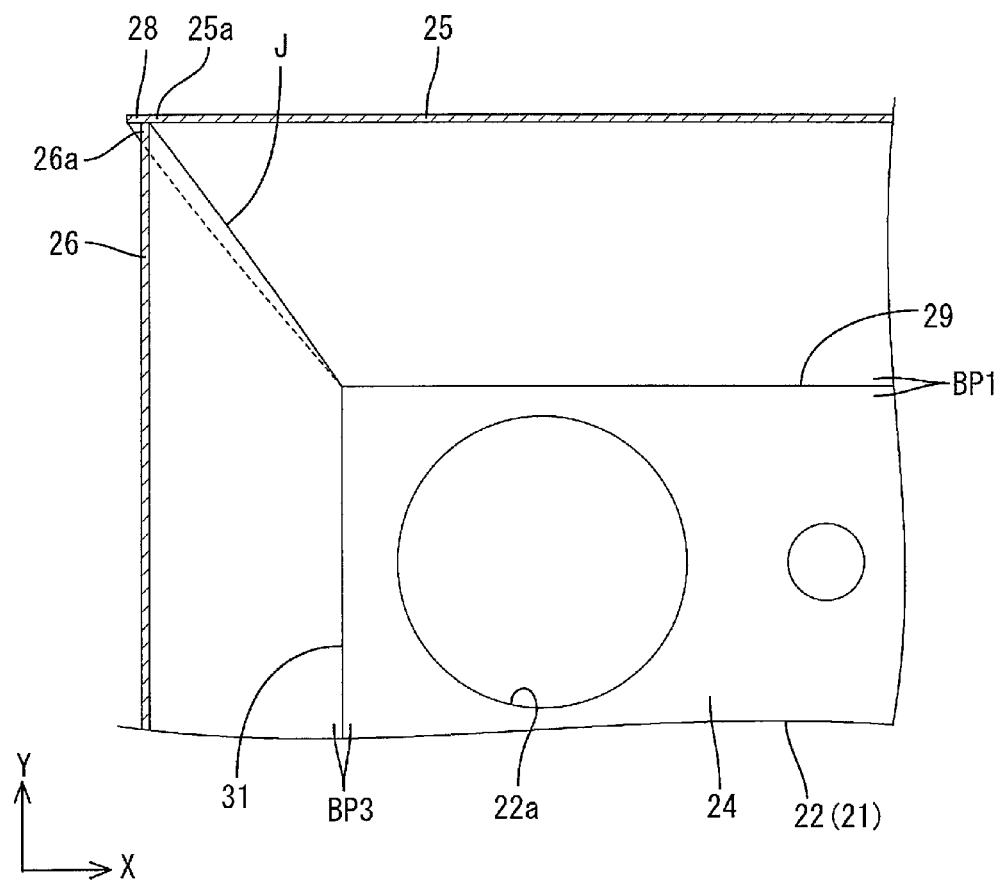
FIG. 10 depicts a top cross section of FIG. 9.
Figure 11:
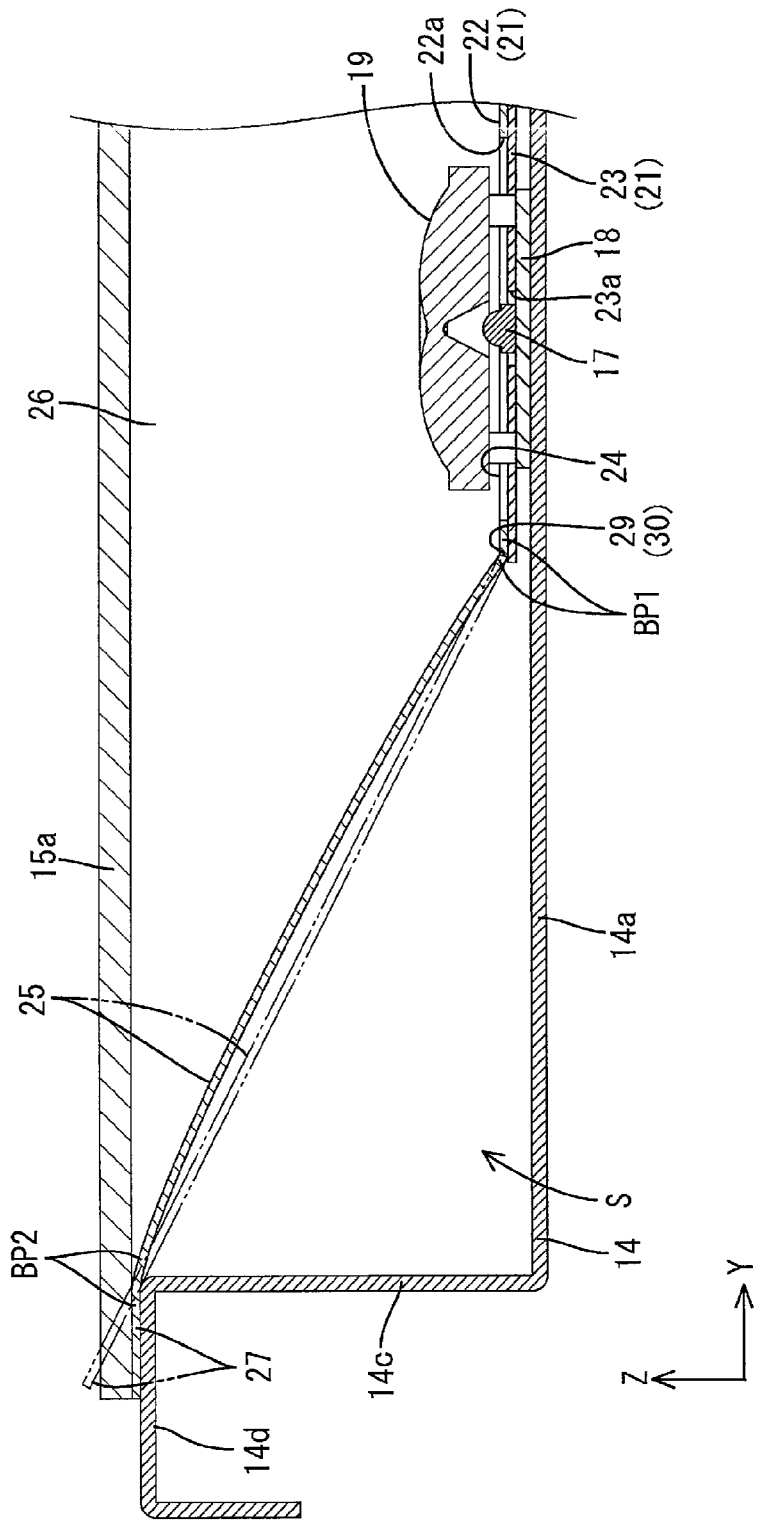
FIG. 11 depicts a cross section of FIG. 9 taken along the segment xi to xi.
Figure 12:
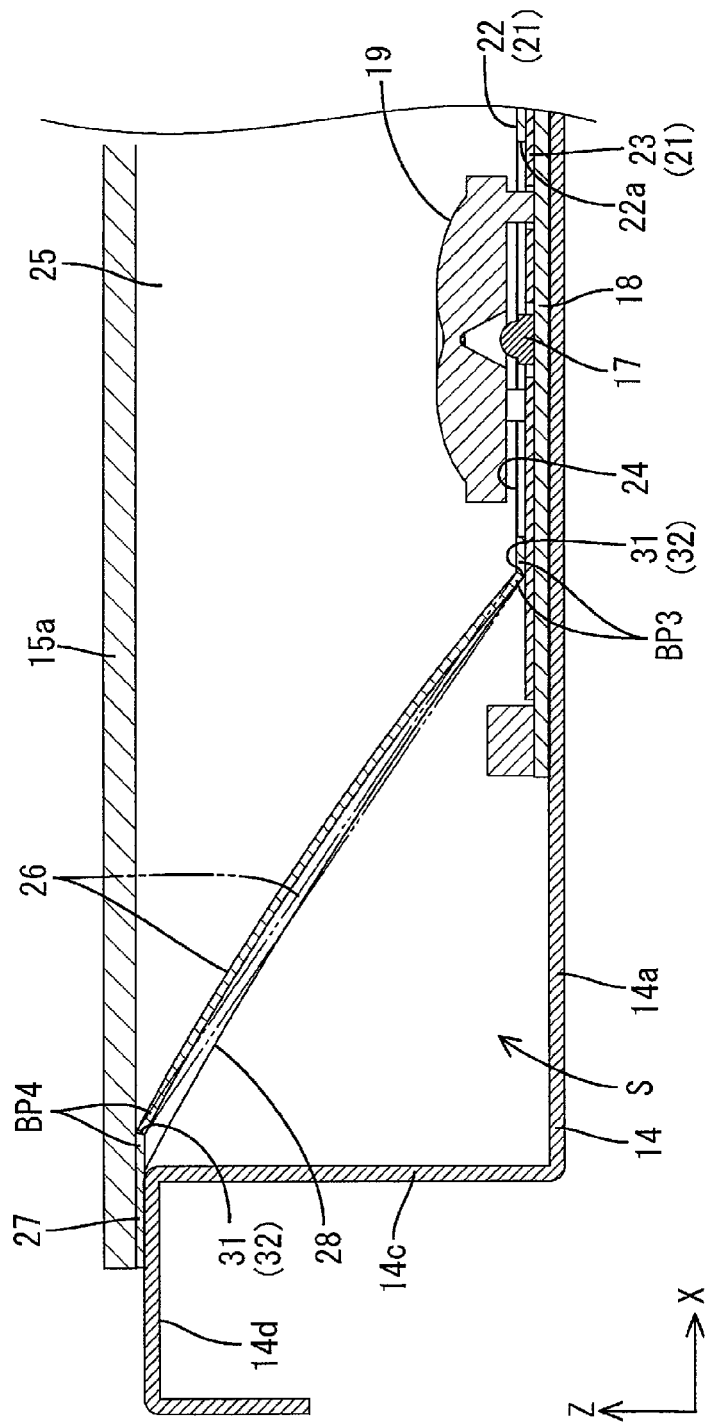
FIG. 12 depicts a cross section of FIG. 9 taken along the segment xii to xii.

In view of the above, the first reflection sheet 22 according to this exemplary embodiment is configured such that the side edges 25a of the long sides of the first raised portions 25 are provided with facing portions 28 as depicted in FIGS. 9 and 10. The facing portions 28 extend outward in the Y-axis direction relative to the side edges 26a of the second raised portions 26; in other words, the facing portions 28 face the side edges 26a by extending in the direction where the first raised portions 25 are raised from the bottom 24. As depicted in FIGS. 10 and 11, the first raised portions 25 provided with the facing portions 28, together with the facing portions 28, bulge toward the front side (i.e., the light exiting side). In more detail, the first raised portions 25 and the facing portions 28, in aside view, gradually bulge toward the front side as from the raised base ends and raised distal ends to the middle side, thereby forming an arched shape. The first raised portions 25 and the facing portions 28 bulge the most at the middle position in the raised direction. Inner surfaces of the facing portions 28 (surfaces facing the second raised portions 26) abut on end faces of the side edges 26a of the adjacent second raised portions 26, thereby applying to the side edges 26a a stress that biases the side edges 26a toward the front side. As depicted in FIG. 12, this stress causes the second raised portions 26, like first raised portions 25, to bulge toward the front side in an arched shape, and restricts the second raised portions 26 from being displaced as if pulled toward the rear side (displaced outward in the X-axis direction). In other words, the side edges 26a are restricted from being displaced in a direction away from the joints J. With this arrangement, even when the first reflection sheet 22 is thermally expanded, the joints J between the first raised portions 25 and the second raised portions 26 are prevented from having clearances, and thus dark regions are prevented from being generated locally near the joints J (i.e., uneven brightness is prevented). In FIGS. 11 and 12, the two-dot chain lines therein respectively indicate the first raised portions 25 and the second raised portions 26 prior to the bulging.

The facing portions 28 are provided to both of the side edges 25a of the pair of first raised portions 25, and thus respectively positioned to correspond to the joints J at the four corners of the first reflection sheet 22 (FIG. 3). As depicted in FIG. 9, the facing portions 28 are formed to cover the entire length of the side edges 25a of the first raised portions 25. In addition, the facing portions 28 are superposed over and remain abutted on the side edges 26a of the second raised portions 26 in the Y-axis direction to cover substantially the entire length thereof. With this arrangement, the second raised portions 26 are, substantially in their entire length, applied with the stress from the facing portions 28, and thus the side edges 26a of the second raised portions 26 are more reliably restricted from being displaced in the direction away from the joints J.

Figure 16:
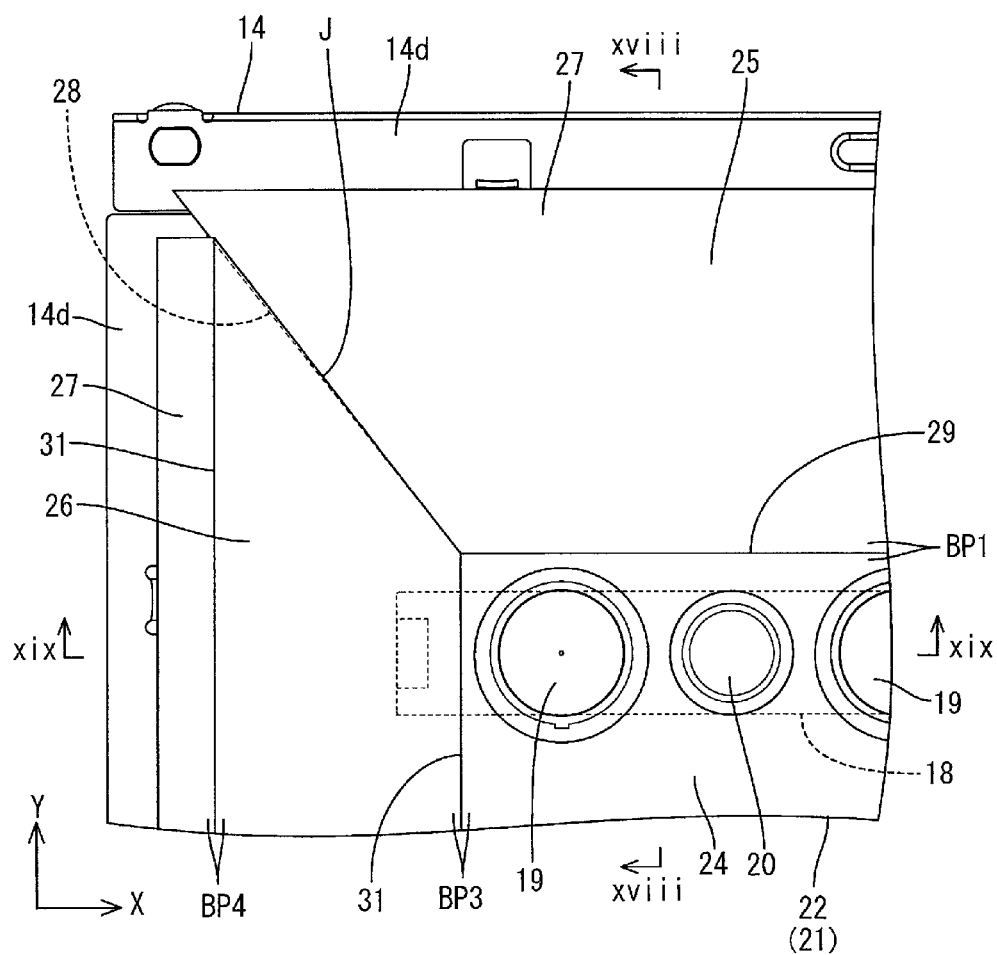
FIG. 16 is an enlarged top view depicting a corner of the chassis when the bent first reflection sheet is mounted on the chassis but before the diffuser plate is attached.
Figure 18:
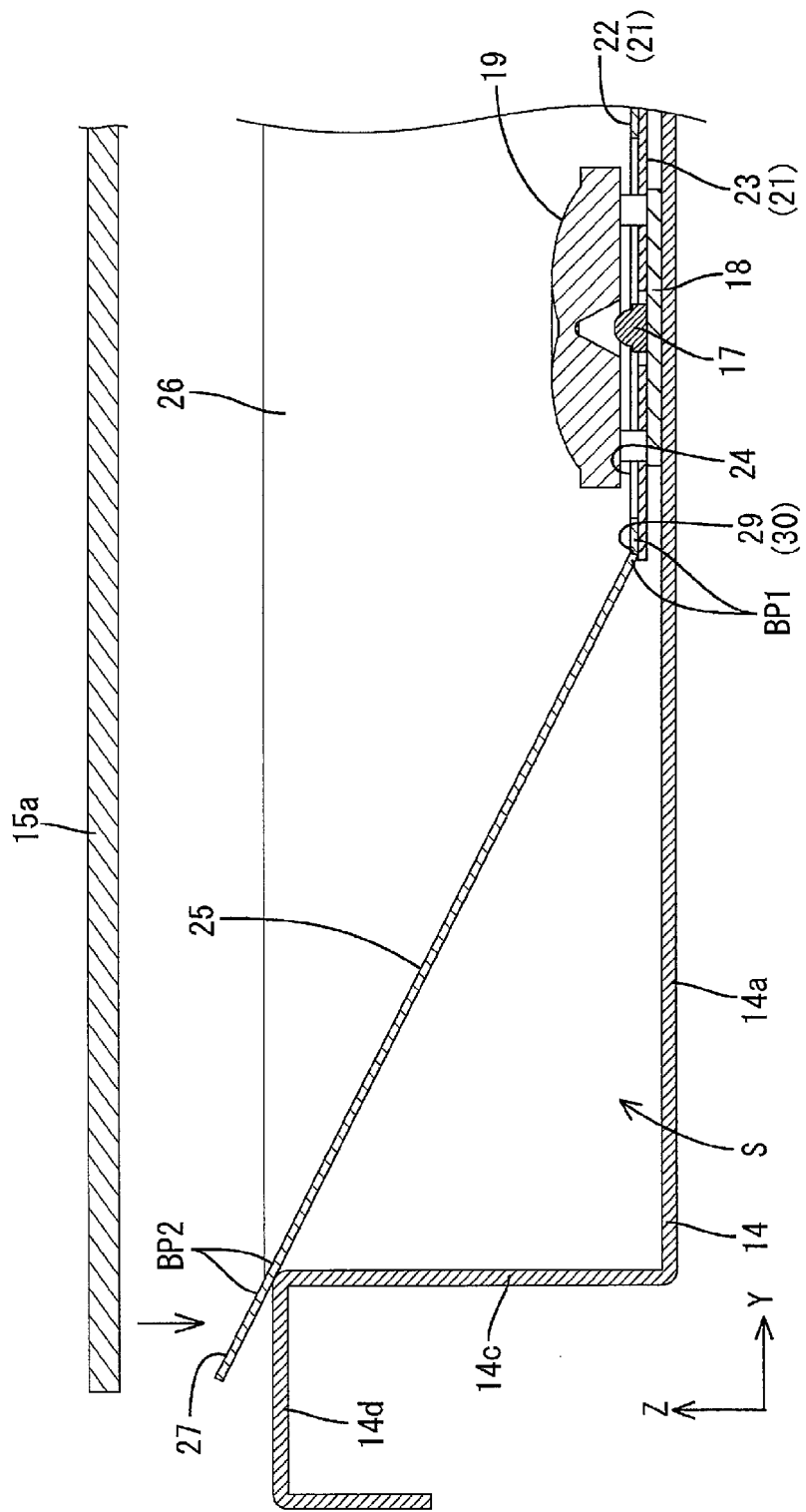
FIG. 18 depicts a cross section of FIG. 13 taken along the segment xviii to xviii.

As described above, in order for the first raised portions 25 and the facing portions 28 to bulge toward the front side, the first reflection sheet 22 according to this exemplary embodiment is structured as follows. The first raised portions (including the facing portions 28) have linear creases 29 extending in the X-axis direction at their raised base end positions (i.e., the boundary positions between the bottom 24 and the first raised portions 25). Boundary portions BP1 between the bottom 24 and the first raised portions 25 are bendable, as depicted in FIG. 11. On the other hand, such creases are not provided at the raised distal end positions of the first raised portions 25 (including the facing portions 28), i.e., at the boundary positions between the first raised portions 25 and the extensions 27. Boundary portions BP2 between the first raised portions 25 and the extensions 27 are curved. In order to structure the first reflection sheet 22 as above, the boundaries between the bottom 24 and the first raised portions 25 are provided with perforations 30 adapted to facilitate the forming of the creases 29, while such perforations are not provided at the boundaries between the first raised portions 25 and the extensions 27. Accordingly, as depicted in FIGS. 16 and 18, when the first reflection sheet 22 spread as in FIG. 13 is bent such that the first raised portions 25 are bent relative to the bottom 24 along the perforations 30, the creases 29 are formed along the perforations 30. In addition, the first raised portions 25 and the extensions 27 are, while substantially collinear with each other, inclined with respect to the bottom 24. Then, by pressing the extensions 27 toward the rear side (lower side in FIG. 18) in this state, the first raised portions 25 are applied with stress that biases the first raised portions 25 to bulge toward the front side. Therefore, with no crease at the boundary between the first raised portions 25 and the extensions 27, the first raised portions 25 are curved to bulge toward the front side (see, FIG. 11). At this time, since the boundary portions BP1 between the bottom 24 and the first raised portions 25 are configured to be bent with the creases 29, the influence exerted by the stress applied to the extensions 27 hardly reaches the bottom 24. Thus, the bottom 24 maintains its flat shape conforming to the bottom plate 14a.

Figure 14:
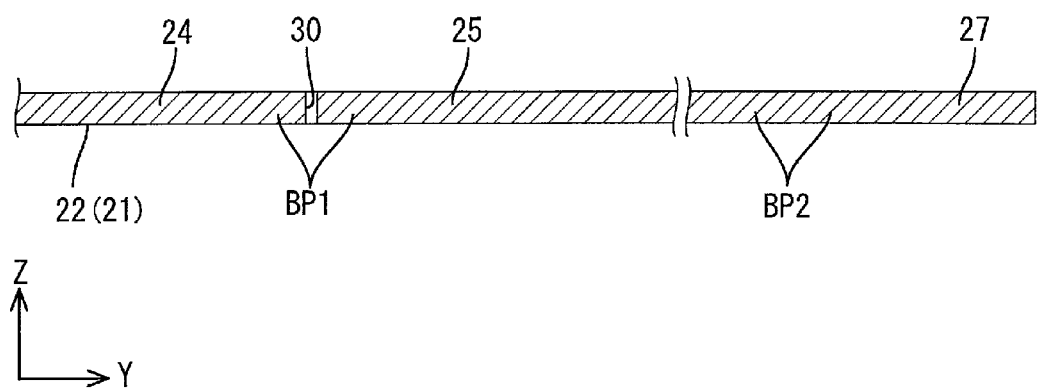
FIG. 14 depicts a cross section of FIG. 13 taken along the segment xiv to xiv.

As depicted in FIG. 14, the above-described plurality of perforations 30 is configured to penetrate the first reflection sheet 22, and juxtaposed linearly at intervals along the bend lines at the boundary positions. With this arrangement, the creases 27 are easily formed by bending the first raised portions 25 without decoupling the first raised portions 25 from the bottom 24, and thus the first raised portions 25 are easily desirably bent with respect to the bottom 24.

Figure 19:
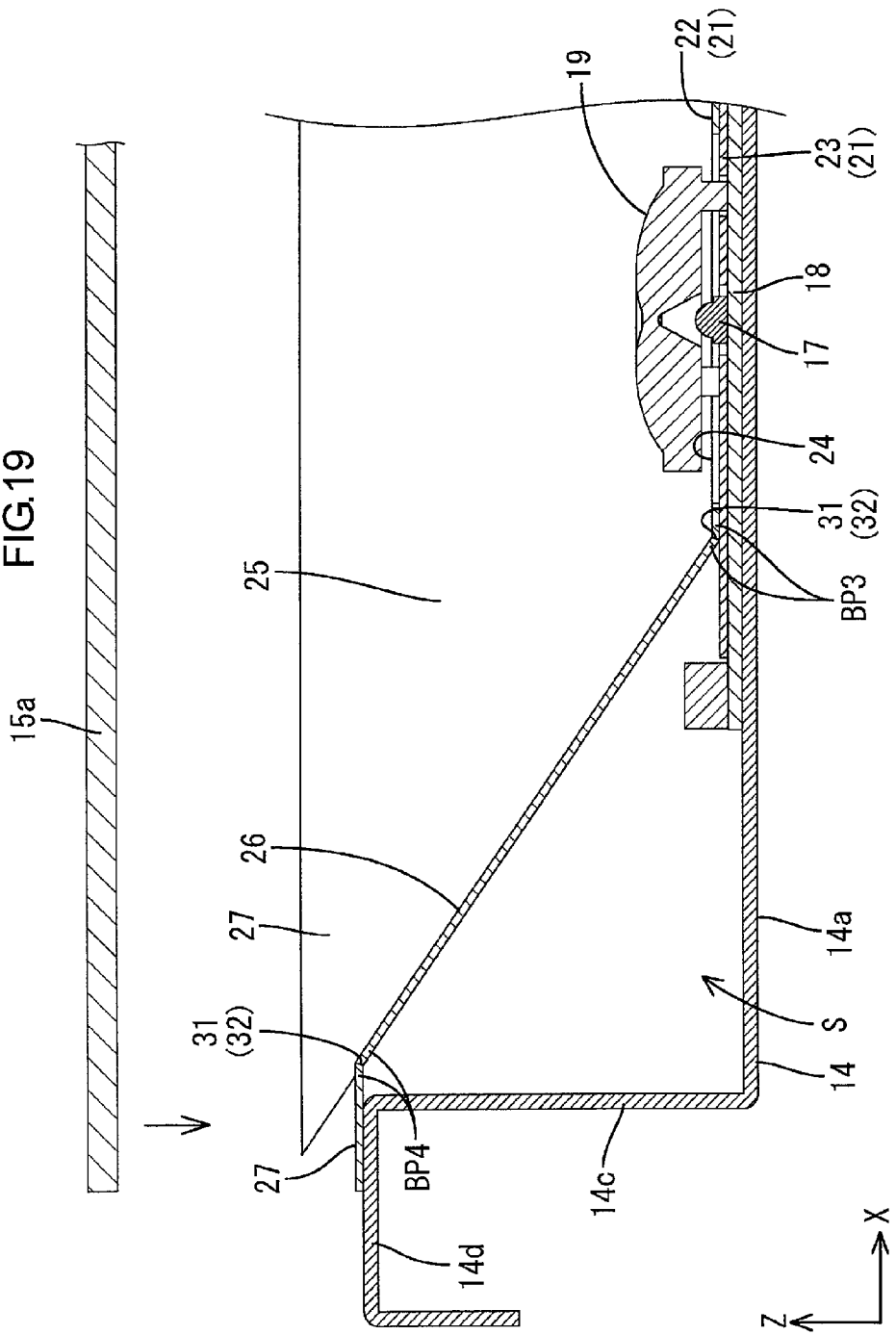
FIG. 19 depicts a cross section of FIG. 13 taken along the segment xix to xix.

In contrast, as depicted in FIG. 12, the second raised portions 26 have creases 31 respectively at their raised base end position and raised distal end positions (i.e., the boundary positions between the bottom 24 and the second raised portions 26, and the boundary positions between the second raised portions 26 and the extensions 27, respectively). Boundary portions BP 3 and BP4, respectively between the bottom 24 and the second raised portions 26 and between the second raised portions 26 and the extensions 27, are bendable. In order to structure the first reflection sheet 22 as above, the boundaries between the bottom 24 and the second raised portions 26 and the boundaries between the second raised portions 26 and the extensions 27 are provided with perforations 32 similar to those provided to the above-described first raised portions 25 (see, FIG. 15). Accordingly, by making the creases 31 along the perforations 32 when forming the spread first reflection sheet 22 into the shape in use, the second raised portions 26 may be inclined with respect to the bottom 24 and the extensions 27 respectively at stabilized inclination angles (i.e., the configuration of the second raised portions will be stabilized.) as depicted in FIG. 19. With this arrangement, at the time of raising the first raised portions 25 and the second raised portions 26 respectively from the bottom 24 of the spread sheet, the facing portions 28 of the side edges 25a of the first raised portions 25 are easily positioned with respect to the side edges 26a of the second raised portions 26. Thus, the facing portions 28 and the side edges 26a are more reliably positioned to face each other.

Figure 17:
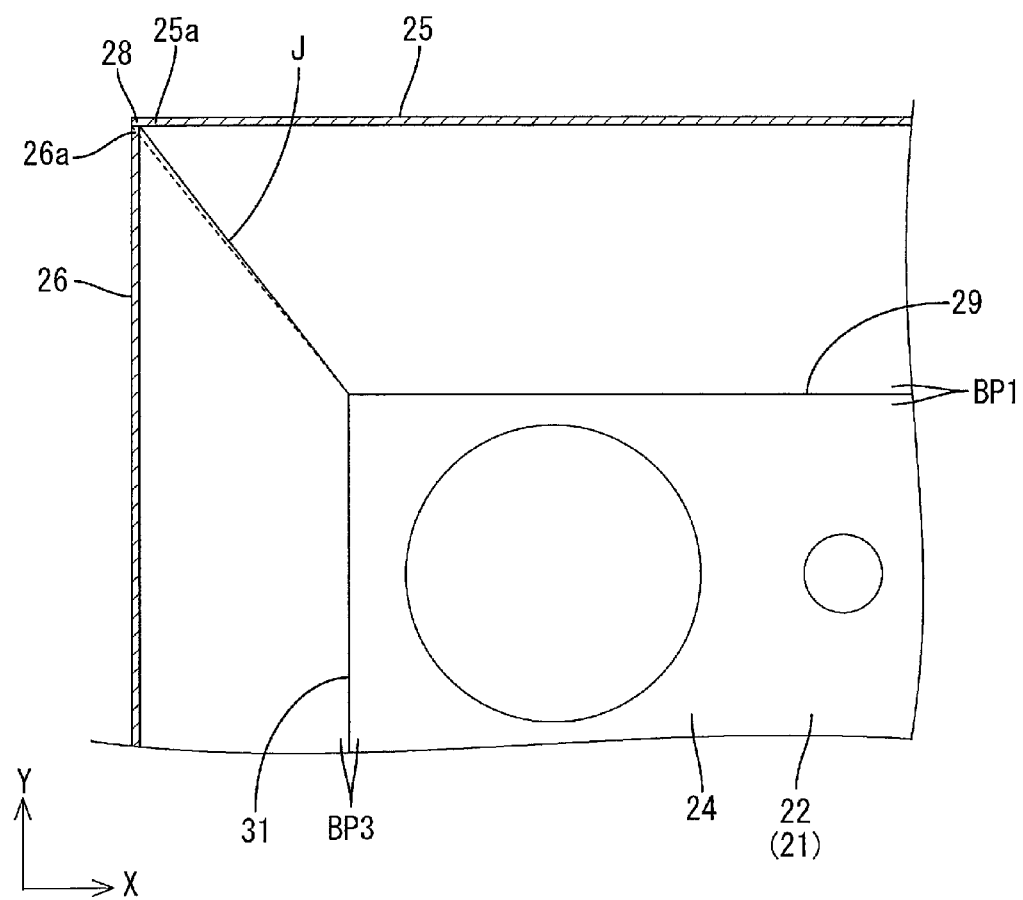
FIG. 17 depicts a top cross section of FIG. 16.

While the first reflection sheet 22 spread as in FIG. 13 is bent such that the portions thereof are bent along the perforations 30 and 32 (this state is hereinafter referred to as "bent state"), the facing portions 28 extend relative to frontward inner surfaces (surface at the light exiting side) of the second raised portions 26 outward in the X-axis direction (i.e., the direction in which the second raised portions 26 are raised from the bottom 24) as depicted in FIG. 17. Extended distal end surfaces of the facing portions 28 are substantially in plane with rearward outer surfaces (surfaces at the side opposite to the light exiting side) of the second raised portions 26. When the first raised portions 25 as well as the facing portions 28 bulge toward the front side in this state and the second raised portions 26 likewise also bulge toward the front side in accordance with the bulging of the first raised portions 25, the second raised portions 26 are displaced inward in the X-axis direction as in FIGS. 10 and 12. Therefore, the extended distal ends of the facing portions 28 relatively protrude from the outer surfaces of the second raised portions 26 outward in the X-axis direction.

Figure 15:
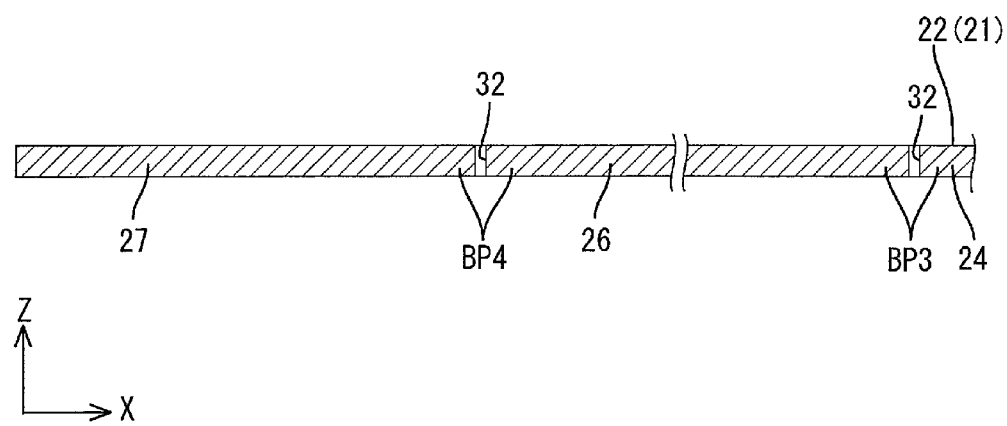
FIG. 15 depicts a cross section of FIG. 13 taken along the segment xv to xv.

This exemplary embodiment is configured as above, and now operations thereof will be described. Initially, a method of manufacturing the first reflection sheet 22 will be described. By punching a large-sized base material for providing the first reflection sheet 22 with molds conformed to the spread shape of the first reflection sheet 22, the first reflection sheet 22 spread as in FIG. 13 is obtained. At this time, the perforations 30 and 32 are formed at the bend positions of the spread first reflection sheet 22. As depicted in FIGS. 13 to 15, the perforations 30 and 32 are provided respectively at the boundaries between the bottom 24 and the first raised portions 25, the boundaries between the bottom 24 and the second raised portions 26 and the boundaries between the second raised portions 26 and the extensions 27 (i.e., bend positions), but no perforation is provided at the boundaries between the first raised portions 25 and the extensions 27 because these boundaries are not subjected to bending. Subsequently, the portions of the spread first reflection sheet 22 are bent at the bend positions along the perforations 30 and 32.

In more detail, as depicted in FIGS. 18 and 19, the first reflection sheet 22 is valley-folded at the boundaries respectively between the raised portions 25 and 26 and the bottom 24 (the raised base end positions), while the first reflection sheet 22 is mountain-folded at the boundaries between the second raised portions 26 and the extensions 27 (the raised distal end positions). At this time, the side edges 25a of the first raised portions 25 and the side edges 26a of the second raised portions 26 are abutted on each other to provide the joints J, and the inner surfaces of the facing portions 28 are abutted on the end surface of the side edges 26a of the second raised portions 26 (see, FIGS. 16 and 17). The facing portions 28 are easily and precisely abutted on the side edges 26a because the configuration of the second raised portions 26 remains stabilized due to the creases 31 made along the perforations 32 at the boundaries respectively between the second raised portions 26 and the bottom 24 and between the second raised portions 26 and the extensions 27 (see, FIG. 19). Therefore, excellent operational reliability and efficiency are obtainable. In this state, the facing portions 28 remain superposed over and abutted the second raised portions 26, covering the entire length of second raised portions 26 in respect of the Y-axis direction (see, FIGS. 16 and 17). On the other hand, no crease is provided between the extensions 27 continued from the raised distal ends of the first raised portions 25 and the raised portions 25, and the extensions 27 are substantially collinear with the first raised portions (see, FIG. 18).

The first reflection sheet 22 bent as described above is housed for use in the backlight unit 12 assembled in the following process. In manufacturing the backlight unit 12, the LED boards 18 having the preliminary assembled LEDs 17, the diffusing lenses 19 and the second reflection sheet 23 are housed in the chassis 14, and then the first reflection sheet 22 is laid in the chassis 14. Subsequently, the holding members 20 and the optical member 15 are, in this order, mounted thereto. When housing the first reflection sheet 22 in the chassis 14, the diffusing lenses 19 are inserted into the corresponding lens insertion holes 22a of the bottom 24, and the insertion holes 22b are communicated with the insertion holes 23c of the second reflection sheet 23. At this time, as depicted in FIG. 19, the extensions 27 continued from the second raised portions 26 are mounted on the receiving plate 14d to extend in parallel thereon substantially without any clearances therebetween. In contrast, as depicted in FIG. 18, since there is no crease between the extensions 27 continued from the first raised portions 25 and the first raised portions 25, the extensions 27 continued from the first raised portions 25 are collinear with the first raised portions 25 to rise up above the receiving plate 14d (be spaced apart from the receiving plate 14d), thereby inclining with respect to the receiving plate 14d. In more detail, the distance between the extensions 27 continued from the first raised portions 25 and the receiving plate 14d is increased as from extending base ends of the extensions 27 (ends closer to the first raised portions 25) toward extending distal ends of the extensions 27, and in other words, the further the extensions 27 extend away from the first raised portions 25, the greater the distance becomes. In addition, the raised portions 25 and 26, the lateral plate 14c and the bottom plate 14a define the substantially triangular space S in a side view. When the holding members 20 are mounted to the chassis 14 in the above state, the first reflection sheet 22, the second reflection sheet 23 and the LED boards 18 are held to the chassis 14 altogether (see, FIGS. 7 and 8).

Subsequently, the diffuser plate 15a and the optical sheets 15b are, in this order, mounted on the receiving plate 14d. When mounting the diffuser plate 15a on the receiving plate 14d, the extensions 27 are to be sandwiched between the diffuser plate 15a and the receiving plate 14d. However, the extensions 27 continued from the first raised portions 25, which rise up above the receiving plate 14d before the diffuser plate 15a is mounted (see, FIG. 18), are pressed toward the rear side by the diffuser plate 15a and deformed to extend parallel to the receiving plate 14d. At this time, the extensions 27 are displaced toward the rear side more greatly at the extending distal end side than at the extending base end side, in accordance with the distance by which the extensions 27 are spaced apart from the receiving plate 14d. With the deformation of the extensions 27, the first raised portions 25 are applied from the extension 27 with the stress that biases the first raised portions 25 toward the front side. Thus, as depicted in FIG. 11, the first raised portions 25 are deformed to bulge toward the front side, thereby forming an arched shape. In this deformation, the boundary portions BP2 between the first raised portions 25 and the extensions 27 are curved without forming a crease. Due to the deformation of the first raised portions 25, the facing portions 28 provided to the side edges 25a thereof are likewise deformed to bulge toward the front side, thereby forming an arched shape. Then, the second raised portions 26, which face the facing portions 28, are applied from the facing portions 28 with the stress that biases the second raised portions 26 toward the front side. Depending on the strength of the stress applied at this time, the second raised portions 26 may also be deformed to bulge toward the front side and form an arched shape similarly to the first raised portions 25, as depicted in FIGS. 10 and 12. The second raised portions 26, depending on the strength of the stress applied, may not be deformed to bulge in an arched shape. Even when not deformed, the second raised portions 26 do receive the stress that biases the second raised portions 26 toward the front side. As described above, since respectively applied with the stress that biases the first and second raised portions 25 and 26 toward the front side, the first and second raised portions 25 and 26 are restricted from displacing toward the rear side, i.e., in the direction opposite to the light exiting side.

The backlight unit 12 manufactured as described above is assembled to the separately-manufactured liquid crystal panel 11 and integrated together by the bezel 13, whereby the liquid crystal display device 10 is manufactured. In using the manufactured liquid crystal display device 10, the LEDs 17 included in the backlight unit 12 are lighted up, and image signals are fed to the liquid crystal panel 11. With this configuration, a predetermined image is displayed on a display of the liquid crystal panel 11. The light emitted by the lighted LEDs 17 is initially incident on the light incident surfaces 19a of the diffusing lenses 19, as depicted in FIGS. 7 and 8. At this time, the majority of the light is incident on the tilted surfaces of the light-incident recesses 19c provided to the light incident surfaces 19a. The tilted surfaces then refract the light at a wide angle according to their tilted angles, and the light is incident into the diffusing lenses 19. Subsequently, the incident light, after traveling through the diffusing lenses 19, exits from the light exiting surfaces 19b. The light exiting surfaces 19b, which are substantially flatly spherical, let out the light while refracting the light at a wider angle by their interfaces with an outer air layer. Furthermore, since regions of the light-exiting surfaces 19b where the intensity of the light from the LEDs 17 is maximized have the substantially bowl-shaped light exiting recesses 19e and substantially flatly-spherical circumferential surfaces, the light-exiting surfaces 19b serve to let out the light by refracting the light at a wide angle with the circumferential surfaces of the light exiting recesses 19e, or serve to reflect the light to the LED boards 18. The light returned to the LED boards 18 is reflected by the second reflection sheet 23 to the diffusing lenses 19, and is incident again on the diffusing lenses 19. Since the light is efficiently utilized, high brightness is obtainable.

As described above, the diffusing lenses 19 are adapted to diffuse highly directional light emitted by the LEDs 17 at a wide angle. Thus, the light incident on the optical member 15 may be distributed uniformly in the plane of the optical member 15. In other words, with use of the diffusing lenses 19, the regions between the adjacent LEDs 17 are less visibly recognized as dark regions, which enables the distances between the LEDs 17 to be increased. With this arrangement, the number of LEDs 17 is reducible while restricting uneven brightness. Since the distances between the adjacent LEDs 17 are increased by reducing the number of the LEDs 17, the holding members 20 are mountable with use of the saved regions. Thus, the holding members 20 strengthen the fixing of the LED boards 18.

When the liquid crystal display device 10 is in use as described above, the LEDs 17 in the backlight unit 12 are switched on or off, which may bring changes to the internal temperature environment. In accordance with such changes, the components of the liquid crystal display device 10 may be thermally expanded or contracted. Out of the components of the liquid crystal display device 10, the first reflection sheet 22 included in the backlight unit 12 is a large-sized and highly thermally expandable component made of synthetic resin. Thus, the first reflection sheet 22 is expanded or contracted in a prominently great amount due to thermal expansion or contraction. For instance, when the temperature in the backlight unit 12 rises and the first reflection sheet 22 is thermally expanded in accordance therewith, the bottom 24 is expanded in the long-side direction (the X-axis direction) in a greater amount than in the short-side direction (the Y-axis direction). With this expansion, the short sides of the bottom 24 (i.e., the raised base end positions of the second raised portions 26) will be greatly displaced outward in the X-axis direction. On the other hand, the raised distal end positions of the second raised portions 26 are substantially fixed, with the extensions 27 continued therefrom sandwiched between the receiving plate 14d and the diffuser plate 15a. Accordingly, the raised base end positions of the second raised portions 26 will come closer to the raised distal end positions thereof, thereby reducing the distance therebetween and generating a deflection of the second raised portions 26. With this deflection, the second raised portions 26 can be displaced as if pulled toward the rear side, and deformed.

Figure 20:
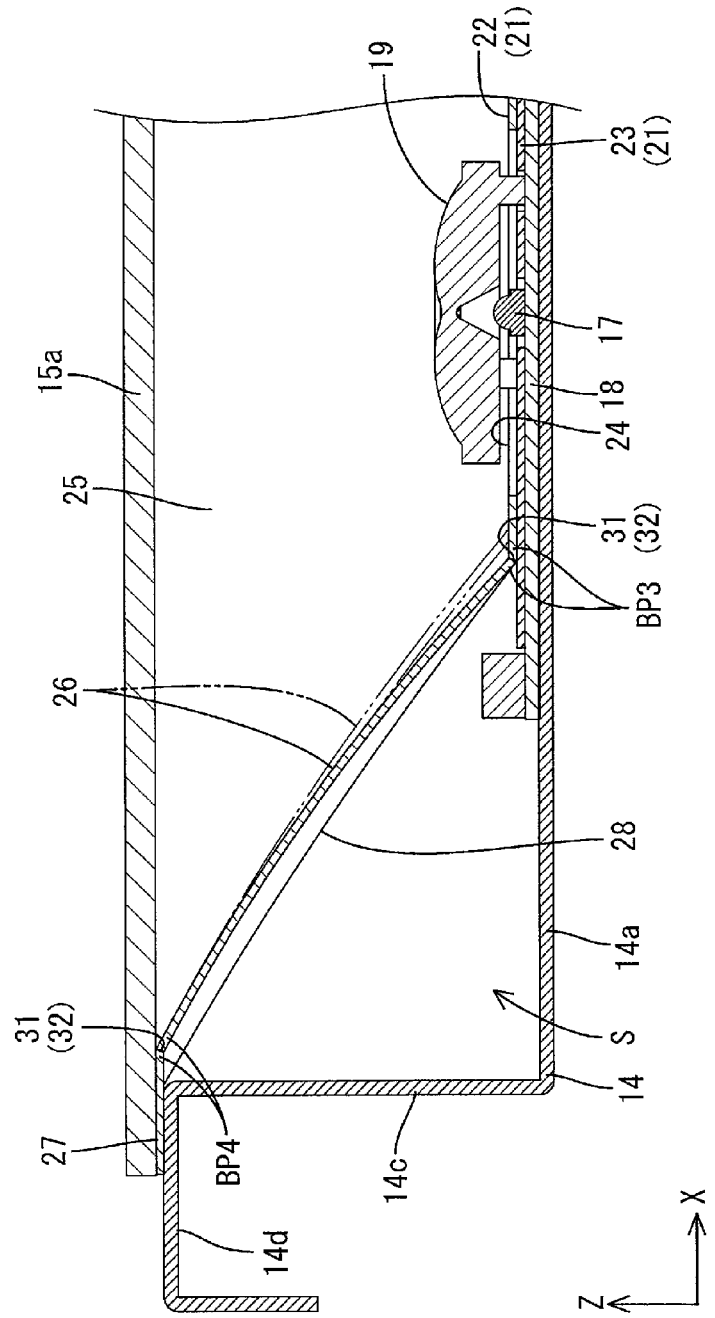
FIG. 20 is a top cross sectional view depicting a second raised portion when the first reflection sheet is thermally expanded.

However, according to this exemplary embodiment, the second raised portions 26 are applied from the facing portions 28 the stress that biases the second raised portions 26 toward the front side. Thus, as depicted in FIG. 20, even when the raised base end positions are displaced as described above, the second raised portions 26 are restricted from being displaced as if pulled toward the rear side. With this arrangement, the joints J between the first raised portions 25 and the second raised portions 26 are prevented from having clearances. In FIG. 20, the two-dot chain lines therein indicate the second raised portions 26 before thermally expanded. Since the second raised portions 26 are deformed to bulge in an arched shape (i.e., curved opposite to the direction of the concerned deflective deformation), thereby generating a tension between the raised base ends and the raised distal ends, the second raised portions 26 are more reliably prevented from being displaced as if pulled toward the rear side. Furthermore, the facing portions 28, which are provided to cover the entire length of the side edges 25a of the first raised portions 25, are abutted on the side edges 26a of the second raised portions 26 while covering the entire length of the side edges 26a. Accordingly, the second raised portions 26 are applied with the above stress in its entire length.

As described above, even when the first reflection sheet 22 is thermally expanded, the joints J between the first raised portions 25 and the second raised portions 26 are prevented from having clearances. Therefore, the light within the internal space defined by the first reflection sheet 22 in the backlight unit 12 is prevented from leaking to the outside through the vicinity of the joints J. Accordingly, the light exiting surface of the entire backlight unit 12 is prevented from generating dark regions locally at the four corners thereof where the joints J are positioned, and thus uniform brightness is achieved in an entire plane surface of the light exiting surface. Since the light exited from the backlight unit 12 is configured to be uniform without unevenness, the display of the liquid crystal display device 10 exhibits good display quality.

As described above, the backlight unit 12 according to this exemplary embodiment includes: the LEDs 17 serving as a light source; the chassis 14 including the bottom plate 14a located opposite to the light exiting side relative to the LEDs 17, the chassis housing the LEDs 17; and the first reflection sheet 22 adapted to reflect light, the first reflection sheet 22 including the quadrangular bottom 24 extending along the bottom plate 14a, and at least two raised portions 25 and 26 respectively raised from at least adjacent two sides of the bottom 24 toward the light exiting side, the joints J being provided between the adjacent two side edges 25a and 26b of the raised portions 25 and 26. In the backlight unit 12, the side edge 25a of the first raised portion 25 of the at least two raised portions 25 and 26 includes the facing portion 28 that faces the side edge 26a of the second raised portion 26 in a direction where the first raised portion 25 is raised from the bottom 24 (outward in the Y-axis direction), and the first raised portion 25 and the facing portion 28 bulge toward the light exiting side.

With this arrangement, the light from the LEDs 17 is reflected by the first reflection sheet 22 having the bottom 24 and the raised portions 25 and 26, and the light is efficiently let out. In the first reflection sheet 22, between the adjacent side edges 25a and 26a of the at least two raised portions 25 and 26 that are respectively raised toward the light exiting side from the at least two adjacent sides of the quadrangular bottom 24, the joints J are provided. If the second raised portion 26 should be deformed to be displaced opposite to the light exiting side, clearances may be brought to the joints J. Accordingly, the light may leak out through the clearances, thus dark regions may be locally generated. One of the solutions to such problem is, for instance, to increase the number of LEDs 17 in the vicinity of the joints J. However, the increase in the number of LEDs 17 will lead to a cost increase.

In view of the above, according to this exemplary embodiment, the side edges 25a of the first raised portion 25 of the at least two raised portions 25 and 26 is provided with the facing portion 28 that faces the side edge 26a of the second raised portion 26 in the direction where the first raised portion 25 is raised from the bottom 24 (outward in the Y-axis direction), and further, the first raised portion 25 and the facing portion 28 bulge toward the light exiting side. Accordingly, the side edge 26a of the second raised portion 26 is applied from the facing portion 28 opposed thereto the stress that biases the second raised portion 26 toward the light exiting side. The stress applied from the facing portion 28 restricts the second raised portion 26 from being displaced in a direction opposite to the light exiting side, and the second raised portion 26 becomes more invulnerable to deflective deformation. With this arrangement, the joints J between the side edge 25a of the first raised portion 25 and the side edge 26a of the second raised portion 26 are prevented from having clearances. Therefore, without increasing the number of LEDs 17, the light is prevented from leaking out through the joints J, and uneven brightness is restricted at low cost.

The bottom 24 is elongated quadrangular, and the second raised portions 26 are raised from the short sides of the bottom 24 while the first raised portions 25 having the facing portions 28 are raised from the long sides of the bottom 24. In this arrangement, when the elongated quadrangular bottom 24 is thermally expanded due to changes in the heat environment, the bottom 24 tends to be thermally expanded in the long-side direction in a greater amount than in the short-side direction. Thus, the raised base end positions of the second raised portions 26 raised from the short sides are displaced in accordance with the thermal expansion of the bottom 24 in the long-side direction, and the second raised portions 26 are easily deformed. However, according to this exemplary embodiment, the first raised portions 25 raised from the long sides are provided with the facing portions 28. Even when the bottom 24 is thermally expanded, the facing portions 28 serve to restrict the second raised portions 26 at the short sides from being displaced in the direction opposite to the light exiting side. Therefore, the joints J are prevented from having clearances, and thus the light is favorably prevented from leaking out therethrough.

The second raised portions 26 are raised from the paired short sides of the bottom 24 while the first raised portions 25 are raised from the paired long sides of the bottom 24. Both of the side edges 25a of the paired first raised portions 25 are provided with the facing portions 28. According to this arrangement, since the facing portions 28 are provided to both of the side edges 25a of the first raised portions 25 raised from the long sides adjacent to the short sides, both of the side edges 26a of the paired second raised portions 26 raised from the short sides are applied with the stress from the facing portions 28. Thus, the second raised portions 26 are more reliably restricted from being displaced in the direction opposite to the light exiting side. With this arrangement, the four joints J provided between the side edges 26a and 25a respectively of the adjacent paired second raised portions 26 and paired first raised portions 25 are prevented from having clearances, and thus uneven brightness is effectively restricted.

In addition, the angles at which the paired second raised portions 26 are raised from the bottom 24 are substantially equal, and the angles at which the paired first raised portions 25 are raised from the bottom 24 are substantially equal. With this arrangement, the light will be reflected by the paired second raised portions 26 each substantially at an equal angle. Likewise, the light will be reflected by the paired first raised portions 25 each substantially at an equal angle. Accordingly, the reflection light reflected by the first reflection sheet 22 may exhibit less unevenness, and thus uneven brightness further restricted.

The diffuser plate 15a is provided as the optical member 15 positioned at the light exiting side with respect to the LEDs 17. While at least the raised distal ends of the first raised portions 25 are provided with the extensions 27 extending outwardly, the chassis 14 is provided with the receiving plate 14d adapted to sandwich with the diffuser plate 15a the extensions 27. According to this arrangement, for example, when the diffuser plate 15a is mounted to the receiving plate 14d while the extensions 27 are raised above the receiving plate 14d, the first raised portions 25 are applied with the stress that biases the first raised portions 25 toward the light exiting side in accordance with the sandwiching of the extensions 27 therebetween. Then, the first raised portions 25, together with the facing portions 28, bulge toward the light exiting side, and the facing portions 28 apply to the second raised portions 26 the stress that biases the side edges 26a of the second raised portions 26 toward the light exiting side.

The second raised portions 26 also budge toward the light exiting side, together with the first raised portions 25 and the facing portions 28. By making the second raised portions 26 bulge toward the light exiting side with the stress from the facing portions 28, the second raised portions 26 are more reliably restricted from being displaced in the direction opposite to the light exiting side. Accordingly, the joints J do not easily have clearances, and thus the leaking out of the light is favorably prevented.

The boundary portions BP1 between the bottom 24 and the first raised portions 25 are bent at the creases 29 while the boundary portions BP2 between the first raised portions 25 and the extensions 27 are curved with no crease. The arrangement where the boundary portions BP2 between the first raised portions 25 and the extensions 27 are curved with no crease will relatively increase the stress applied to the first raised portions 25 when the extensions 27 are sandwiched between the diffuser plate 15a and the receiving plate 14d, as compared to an arrangement where the boundary portions BP2 are bent at creases. Thus, the stress applied from the facing portions 28 to the side edges 26a of the second raised portions 26 is increased, and therefore the second raised portions 26 is more reliably restricted from being displaced in the direction opposite to the light exiting side. Accordingly, the joints J do not easily have clearances, and thus the leaking out of the light is favorably prevented.

Out of the boundaries between the bottom 24 and the first raised portions 25 and the boundaries between the first raised portions 25 and the extensions 27, the boundaries between the bottom 24 and the first raised portions 25 are provided with the perforations 30 that serve as recesses for facilitating the forming of the creases 29. According to this arrangement, when the first raised portions 25 are raised from the bottom 24, the perforations 30 facilitate the forming of the creases 29 at the boundaries. Thus, the first raised portions 25 are easily formed into a desirable configuration. On the other hand, the boundaries between the first raised portions 25 and the extensions 27 are provided with no perforations, and thus creases are hardly made. Therefore, the stress is more reliably applied to the first raised portions 25 when the extensions 27 are sandwiched between the diffuser plate 15a and the receiving plate 14d.

The raised distal ends of the second raised portions 26 are provided with the extensions 27 extending outward. The boundaries between the bottom 24 and the second raised portions 26 and the boundaries between the second raised portions 26 and the extensions 27 are provided with the perforations 32 that serve as recesses for facilitating the forming of the creases 31. According to this arrangement, when the second raised portions 26 are raised from the bottom 24, and also when the extensions 27 are mounted on the receiving plate 14d, the perforations 32 facilitate the forming of the creases 31 at the boundaries. With this arrangement, the configuration of the second raised portions 26 is stabilized. Thus, the facing portions 28 of the first raised portions 25 are easily and reliably placed to face the side edges 26a of the second raised portions 26, thereby more reliably applying the stress from the facing portions 28 to the second raised portions 26.

The recesses include the plurality of perforations 30 and 32 juxtaposed linearly at intervals. With this arrangement, the recesses (perforations 30 and 32) are formed at low cost at the time of manufacturing the first reflection sheet 22.

The facing portions 28 are provided to the side edges 25a of the first raised portions 25 to cover the entire length thereof. According to this arrangement, the facing portions 28 provided to the side edges 25a of the first raised portions 25 to cover the entire length thereof may apply the stress to the second raised portions 26, and thus more reliably restrict the second raised portions 26 from being displaced in the direction opposite to the light exiting side. Therefore, the joints J are more steadily prevented from having clearances.

The raised portions 25 and 26 are inclined with respect to the bottom 24. Accordingly, the raised portions 25 and 26 serve to reflect the light toward the light exiting side at a favorable angle.

The raised portions 25 and 26 are substantially linear. Thus, the raised portions 25 and 26 serve to reflect the light toward the light exiting side at a more favorable angle.

The chassis 14 includes the lateral plate 14c that stands from the bottom plate 14a and defines with the raised portions 25 and 26 the space S. Since the space S is maintained between the second raised portions 26 and the lateral plate 14c, the second raised portions 26 may be adversely deformed to recede into the space S. However, the facing portions 28 provided to the side edges 25a of the first raised portions 25 favorably restrict the above displacement of the second raised portions 26, and thus the light is prevented from leaking through the joints J.

The light source may be LEDs 17. Thus, high brightness, power saving and the like are achievable.

The plurality of LEDs 17 is mounted on the LED boards 18 that extend parallel to the bottom plate 14a and the bottom 24. In mounting the plurality of LEDs 17 on the LED boards 18, in order to gather the greater number of the LEDs 17, for instance, in the vicinity of the joints J as has been done in a known technique, the LEDs 17 need to be arranged on the LED boards 18 in a disproportional manner. Thus, manufacturing of dedicated LED boards will be required, which leads to a cost increase. However, the facing portions 28 are provided to the side edges 25a of the first raised portions 25 of the first reflection sheet 22 as described above, which serves to dispense with a known method. Thus, for instance, general-purpose LED boards 18 on which the LEDs 17 are regularly disposed are usable. Accordingly, further a cost reduction is achievable.

The diffusing lenses 19, which are adapted to diffuse the light from the LEDs 17 and let out the light, are positioned at the light exiting side relative to the LEDs 17. With this arrangement, the light emitted by the LEDs 17 is diffused by the diffusing lenses 19 and let out through the diffusing lenses 19. Accordingly, since the let-out light exhibits less unevenness, the number of the LEDs 17 is reducible, and thus a cost reduction is achievable.

Second Embodiment

A second exemplary embodiment according to an aspect of the present invention will be described with reference to FIGS. 21 to 25. In this second exemplary embodiment, the light source in the above first exemplary embodiment is replaced by a hot cathode tube 40, and a diffuser plate 115a has a different configuration. The configurations, operations and effects similar to those of the above first exemplary embodiment will not be described in duplicate.

Figure 21:
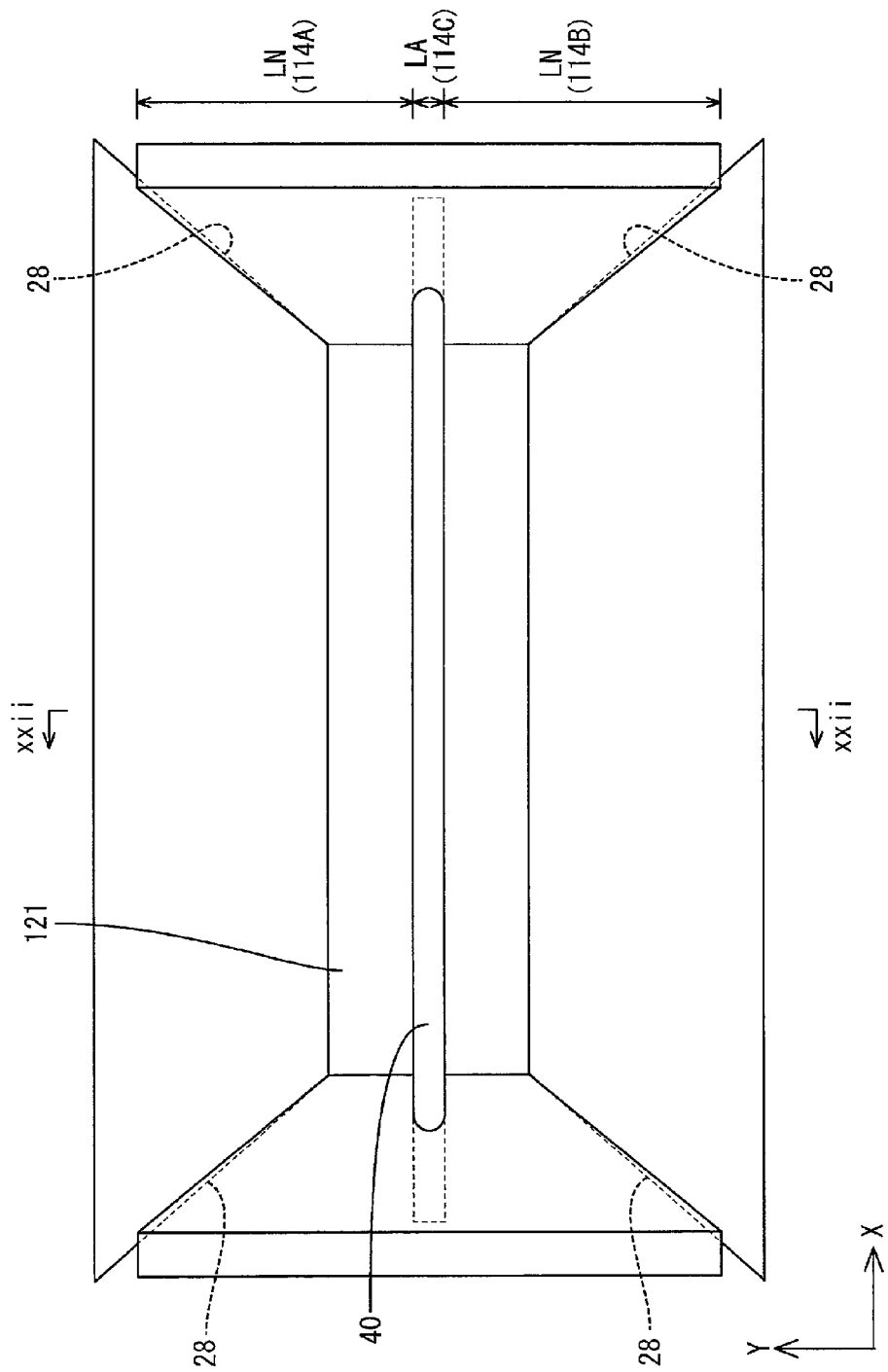
FIG. 21 is a top view depicting a layout of a hot cathode tube and a reflection sheet in a chassis of a second exemplary embodiment according to an aspect of the present invention.
Figure 22:
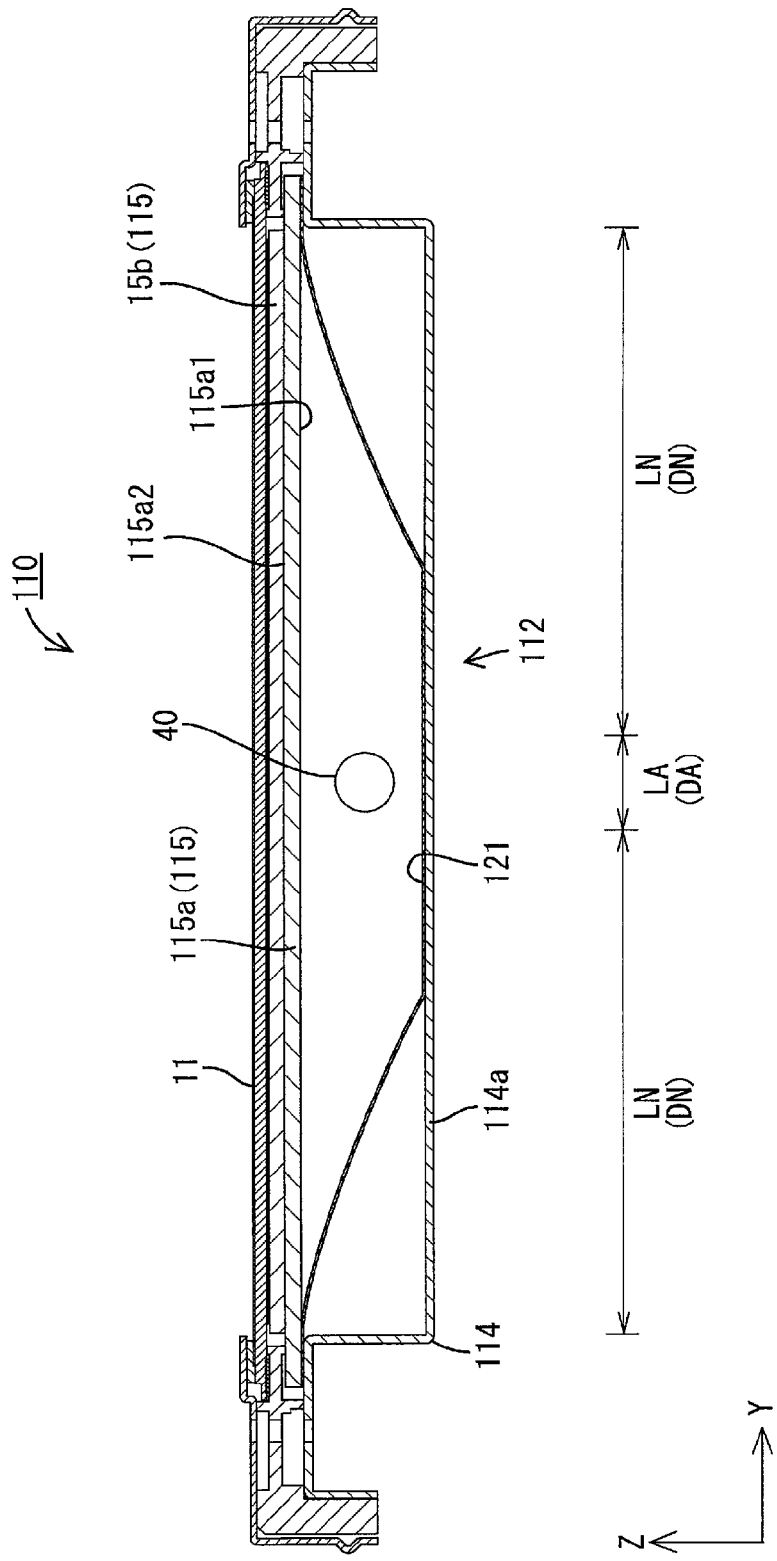
FIG. 22 depicts a cross section of FIG. 21 taken along the segment xxii to xxii.

As depicted in FIGS. 21 to 22, the backlight unit 112 according to this exemplary embodiment uses the hot cathode tube 40 as its light source. The hot cathode tube 40, which is in its entirety tubular (linear), includes a hollow glass tube and a pair of electrodes provided at both ends of the glass tube. The glass tube is encapsulated with mercury and noble gas, and its inner wall surface is applied with a fluorescent material. The hot cathode tube 40, which has its emitting surface on an outer circumference of the glass tube, is adapted to emit light radially from its axial core. Both ends of the hot cathode tube 40 are fitted into sockets (not illustrated). Via the sockets, the electrodes are connected to a power supply board attached to an outer surface (rear surface) of a bottom plate 114a of a chassis 114, and fed with power supply therefrom.

The hot cathode tube 40 configured as above is singularly housed in the chassis 114 with its long-side direction (axial direction) coincident with a long-side direction of the chassis 114. The hot cathode tube 40 is positioned substantially at the middle of the chassis 114 in a short-side direction of the chassis 114. In more detail, if a portion of the chassis 114 opposed to a diffuser plate 115a is to be divided in the short-side direction (the Y-axis direction) into a first end portion 114A, a second end portion 114B located at an end of the chassis 114 opposite to the first end portion 114A and a center portion 114C interposed between the first and second end portions 114A and 114B, the hot cathode tube 40 is positioned at the center portion 114C, thereby providing a light-source arranged region LA. On the other hand, the first end portion 114A and the second end portion 114B of the chassis 114, at neither of which the hot cathode tube 40 is positioned, provide no-light-source arranged regions LN. In other words, the hot cathode tube 40 is arranged locally at the center portion 114C (i.e., middle position of the bottom plate 114a of the chassis 114 in the short-side direction) to provide the light-source arranged region LA. The area of the light-source arranged region LA (longitudinal dimension in the Y-axis direction) is smaller than the area of the no-light-source arranged regions LN (longitudinal directions in the Y-axis direction). Further, the proportion of the area of the light-source arranged region LA (longitudinal dimension in the Y-axis direction) to the area of the entire screen (vertical dimension (short-side dimension) of the screen) is exemplarily set to be approximately 4%. The areas of the paired non-light-source arranged regions LN are substantially equal. In this exemplary embodiment, the second reflection sheet 23 used in the above-described first exemplary embodiment is dispensed, and only the first reflection sheet 22 used in the first exemplary embodiment is used as a reflection sheet 121. The reflection sheet 121 is configured similarly to the first reflection sheet 22 described in the first exemplary embodiment, and has the facing portions 28 as well (see, FIG. 21).

Then next, the diffuser plate 115a will be described. As depicted in FIG. 22, the diffuser plate 115a includes a base substrate in the entire of which light transmittance and light reflectance are substantially uniform with diffusing particles blended therein in a dispersed manner. Specifically, the base substrate of the diffuser plate 115a is preferably configured to exhibit, for instance, the light transmittance of approximately 70% and the light reflectance of approximately 30%. The diffuser plate 115a has a rear surface opposed to the hot cathode tube 40 (hereinafter referred to as first surface 115a1) and a front surface located opposite to the first surface 115a1 and opposed to the liquid crystal panel 11 (hereinafter referred to as second surface 115a2). The first surface 115a1 serves as a light incident surface through which the light from the hot cathode tube 40 is incident, and the second surface 115a2 serves as a light exiting surface through which the light (illumination light) is let out toward the liquid crystal panel 11.

Figure 23:
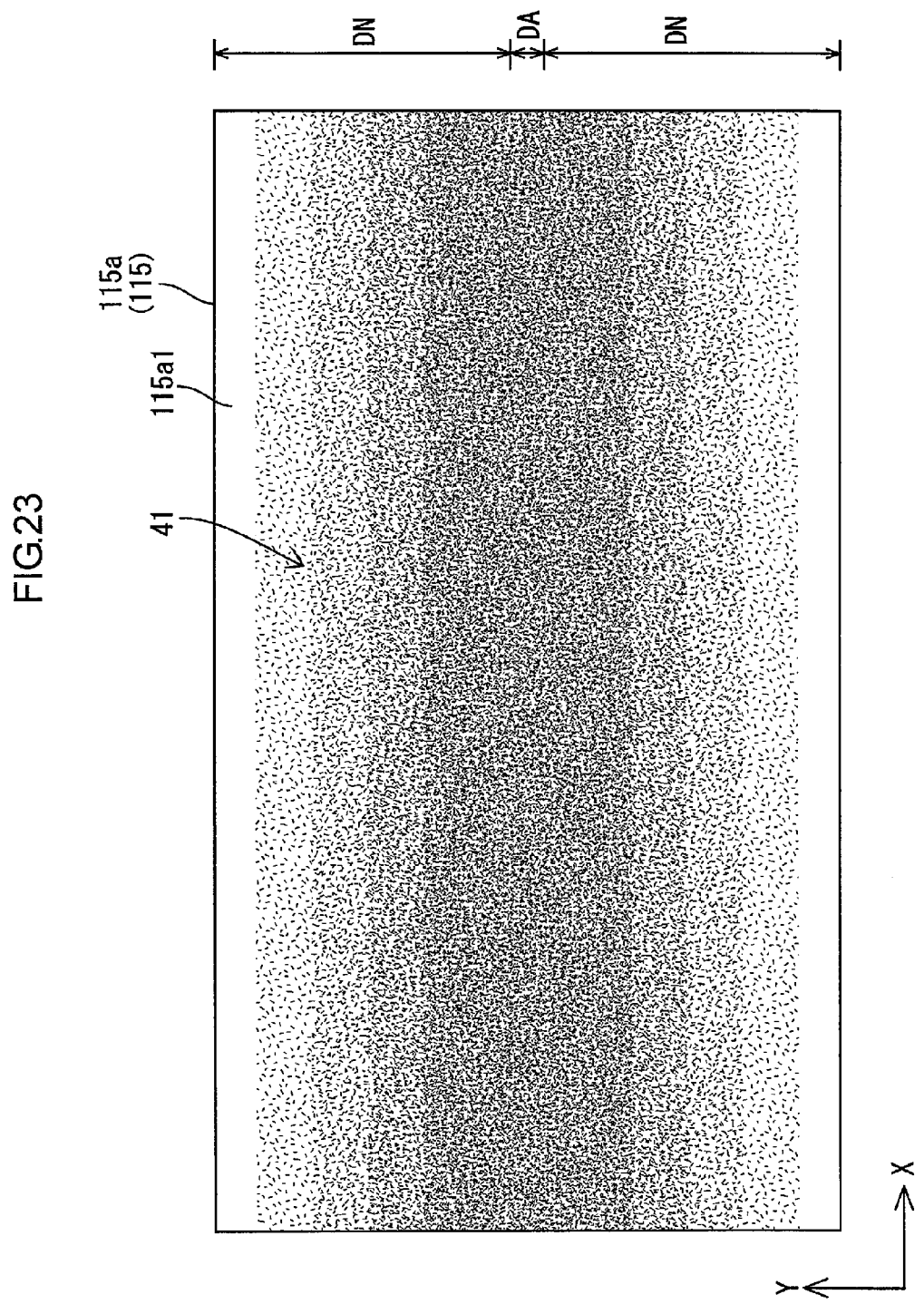
FIG. 23 is a top view for explaining a distribution of light reflectance in a diffuser plate.
Figure 24:
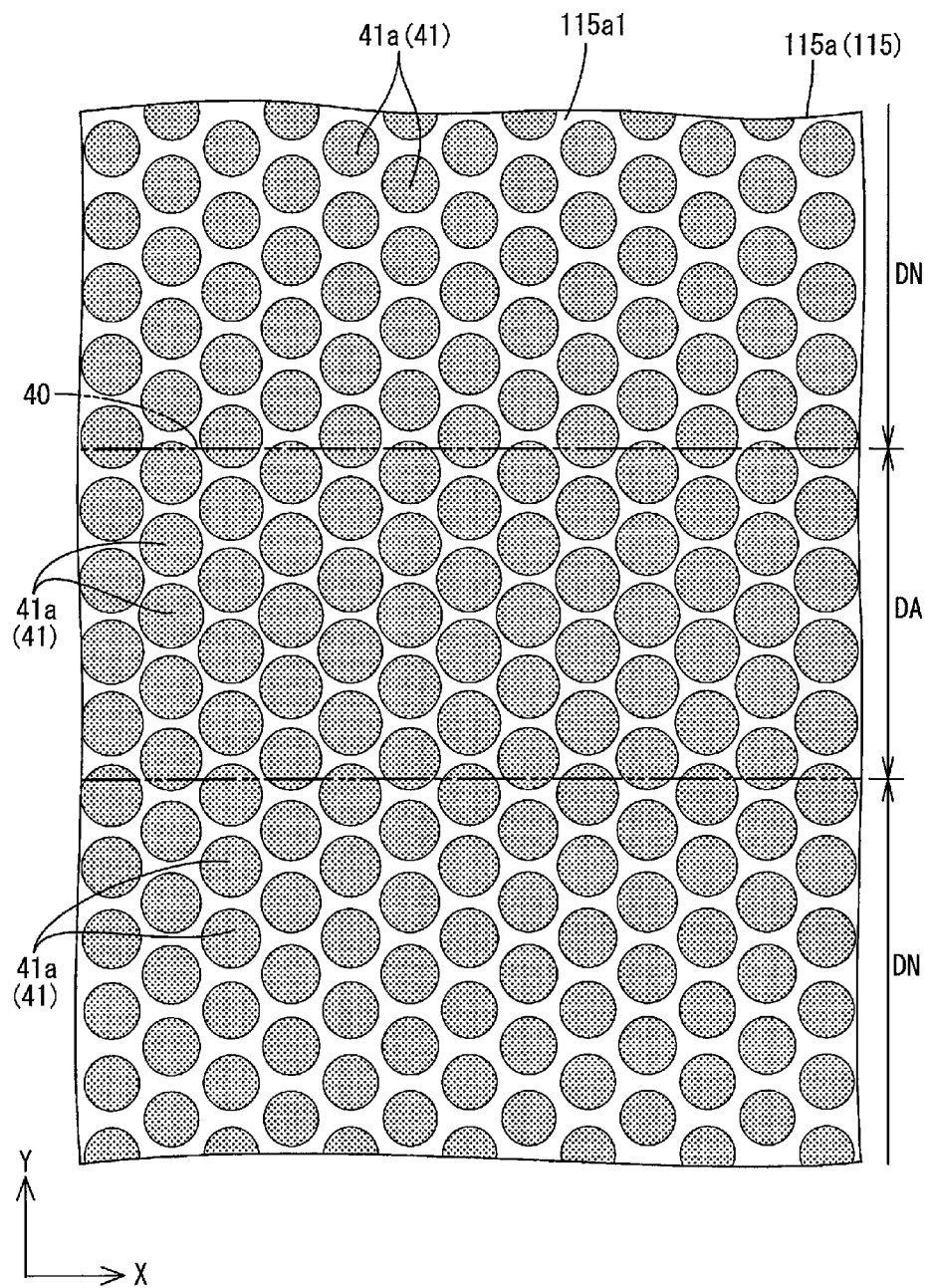
FIG. 24 is an enlarged top view primarily and schematically depicting a surface of the diffuser plate opposed to the hot cathode tube.

As depicted in FIGS. 23 and 24, a dot-patterned light reflector 41 of white color is provided on the first surface 115a1 of the diffuser plate 115a (i.e., the light incident surface). The light reflector 41 is configured such that a plurality of dots 41a circular in a planar view are disposed in a zigzag manner (staggered or alternate manner). The dot pattern of the light reflector 41 is formed by printing, for instance, paste containing metal oxide onto the surface of the diffuser plate 115a. The printing is preferably screen printing, ink jet printing or the like. The light reflector 41 is configured to exhibit by itself, for example, the light reflectance of approximately 75%. As compared to the diffuser plate 115a, whose own in-plane light reflectance is approximately 30%, the light reflector has a greater light reflectance. According to this exemplary embodiment, the light reflectance of each material is an average light reflectance exhibited within a diameter of an area measured by CM-3700d LAV (measurement diameter of 25.4 mm) manufactured by Konica Minolta Optics, Inc. The light reflectance of the light reflector 41 itself is measured such that: the light reflector 41 is formed to cover the entire surface of the glass substrate; and the surface on which the light reflector 41 is formed is measured by the above measurement method.

Figure 25:
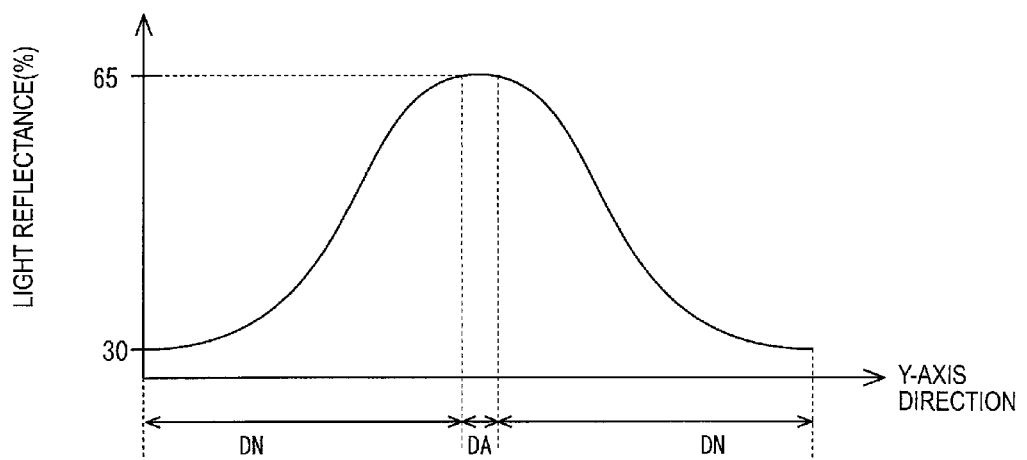
FIG. 25 depicts a graph for indicating changes of light reflectance in a short-side direction of the diffuser plate.

The diffuser plate 115a, which extends in a long-side direction (the X-axis direction) and a short-side direction (the Y-axis direction), changes the light reflectance of the first surface 115a1 (i.e., the surface of the diffuser plate 115a opposed to the hot cathode tube 40) along the short-side direction as depicted in FIG. 25, by changing the dot pattern of the first reflector 41 (see, FIG. 23). In other words, as depicted in FIG. 23, the diffuser plate 115a is configured such that, in the entirety of the first surface 115a1, a section superposed over the hot cathode tube 40 (hereinafter referred to as light-source superposed section DA) exhibits a greater light reflectance than sections not superposed over the hot cathode tube 40 (hereinafter referred to as no-light-source superposed section DN). The light reflectance exhibited by the first surface 115a1 of the diffuser plate 115a is substantially constant in the long-side direction with little changes (see, FIG. 23).

A light reflectance distribution in the diffuser plate 115a will be described in detail. As depicted in FIGS. 23 to 25, the light reflectance of the diffuser plate 115a is sequentially reduced as away from the hot cathode tube 40 in the short-side direction (the Y-axis direction), and sequentially increased as close to the hot cathode tube 40 in the short-side direction (the Y-axis direction). A distribution of the light reflectance is adapted to be a normal distribution (the distribution describes a bell-shaped curved line). Specifically, the light reflectance of the diffuser plate 115a is maximized at the middle position of the diffuser plate 115a in the short-side direction (position coincident with the center of the hot cathode tube 40) and minimized at both ends of the diffuser plate 115a in the short-side direction. The maximum of the light reflectance is exemplarily set at approximately 65%, while the minimum of the light reflectance is exemplarily set at approximately 30% (i.e., equal to the light reflectance of the diffuser plate 115a itself). Accordingly, at both ends of the diffuser plate 115a in the short-side direction, the light reflector 41 is disposed only in a small amount or the light reflector 41 is hardly disposed.

In order to obtain the above-described light reflectance distribution, the light reflector 41 is configured as follows. Out of the dots 41a included in the light reflector 41, the dots 41a located at the middle position of the diffuser plate 115a in the short-side direction (i.e., the dots 41a positioned to correspond to the center position of the hot cathode tube 40) have the maximum areas. The areas of the dots 41a are gradually reduced as the dots 41a are located away from the middle position of the diffuser plate 115a in the short-side direction, and the dots 41a located at the positions closest to the ends of the diffuser plate 115a in the short-side direction have the minimum areas. In other words, the greater the distance from the center of the hot cathode tube 40 becomes, the smaller the areas of the dots 41a become. The above-configured diffuser plate 115a, in its entirety, serves to moderate the brightness distribution of the illumination light, which consequently leads to the moderated illumination brightness distribution of the backlight unit 112 as a whole. Alternatively, the light reflectance may be adjusted by changing the distances between the dots 41a of the light reflector 41 while equalizing the areas of the dots 41a.

As described above, by gathering the hot cathode tubes 40 at the center portion 114C in the chassis 114, and providing the diffuser plate 115a with the light reflector 41, the following advantages are exemplarily obtainable. When the hot cathode tube 17 is switched on as depicted FIG. 23, the light incident efficiency is properly controlled per each region of the diffuser plate 115 because the first surface 115a1 of the diffuser plate 115 through which the light emitted therefrom is incident is provided with the light reflector 41 that exhibits different light reflectance depending on its in-plane region. In more detail, the light-source superposed section DA of the first surface 115a1 superposed over the hot cathode tube 40 is exposed to direct light from the hot cathode tube 40 in a relatively greater amount than the no-light-source superposed sections DN of the first surface 115a1. Accordingly, by relatively increasing the light reflectance (the areas of the dots 41a) of the light reflector 41 at the light-source superposed section DA (see, FIGS. 23 and 25), the light incident on the first surface 115a1 is suppressed (restricted) and much of the light is reflected to return to the chassis 114. On the other hand, the no-light-source superposed sections DN of the first surface 115a1 not superposed over the hot cathode tube 40 are exposed to direct light from the hot cathode tube 40 in a relatively smaller amount than the light-source superposed sections DA of the first surface 115a1. Therefore, by relatively reducing the light reflectance (the areas of the dots 41a) of the light reflector 41 at the no-light-source superposed sections DN (see, FIGS. 23 and 25), the light is facilitated to be incident on the first surface 115a1. At this time, the no-light-source superposed sections DN are compensated with the light by guiding to the no-light-source superposed sections DN with use of the reflection sheet 121 the light reflected to the chassis 114 by the light reflector 41 of the light-source superposed section DA, and thus the sufficient amount of the light is reliably incident on the no-light-source superposed sections DN. Accordingly, the light emitted by the hot cathode tube 40 is subjected to the above-described optical effects while being transmitted through the diffuser plate 115a, and converted within the plane of the diffuser plate 115a into substantially uniform planar light having no unevenness. Then, the light is subjected to further optical effects through the optical sheets 15b and illuminated onto the liquid crystal panel 11.

According to this exemplary embodiment described as above, the backlight unit 112 includes the diffuser plate 115a (i.e., the optical member 115) located at the light exiting side relative to the hot cathode tube 40 (i.e., the light source). In the backlight unit 112, the portion of the chassis 114 opposed to the diffuser plate 115a is divided into the light-source arranged region LA arranged with the hot cathode tube 40 and the no-light-source arranged regions LN not arranged with the hot cathode tube 40. On the other hand, at least the first surface 115a1 (i.e., the surface opposed to the hot cathode tube 40) of the diffuser plate 115a superposed over the light-source arranged region LA (the light-source superposed section DA) exhibits a greater light reflectance than at least the first surface 115a1 (i.e., the surface opposed to the hot cathode tube 40) of the diffuser plate 115a superposed over the no-light-source arranged regions LN (the no-light-source superposed sections DN). With this arrangement, the light emitted by the hot cathode tube 40 is initially incident on the portion of the diffuser plate 115a having a relatively great light reflectance (the light-source superposed section DA), and much of the light is reflected (in other words, is not transmitted through the diffuser plate 115a). Thus, the brightness of the illumination light is restricted irrespective of the amount of the light emitted by the hot cathode tube 40. On the other hand, the light reflected by the light-source superposed section DA is adapted to be re-reflected by the reflection sheet 121 in the chassis 114 to be directed to the no-light-source arranged regions LN. Out of the diffuser plate 115a, the portion superposed over the no-light-source arranged regions LN (the no-light-source superposed sections DN) exhibits a relatively small light reflectance, and much of the light is transmitted therethrough. Thus, the illumination light is adapted to achieve the predetermined brightness.

In addition, at least the portion of the chassis 114 opposed to the diffuser plate 115a is divided into the first end portion 114A, the second end portion 114B positioned at the end of the chassis 114 opposite to the first end portion 114A and the center portion 114C interposed between the first end portion 114A and the second end portion 114B, and the center portion 114C serves as the light-source arranged region LA while the first and second end portions 114A and 114B serve as the no-light-source arranged regions LN. According to this arrangement, sufficient brightness is reliably attained at the center of the backlight unit 112, and thus a liquid crystal display device 110 including the backlight unit 112 also reliably obtains the brightness at its display center. Therefore, good visibility is obtainable.

The light source is provided by the hot cathode tube 40. Accordingly, the enhancement of the brightness and the like are realized.

Third Embodiment

A third exemplary embodiment according to an aspect of the present invention will be described with reference to FIG. 26. In this third exemplary embodiment, the light source in the above second exemplary embodiment is replaced by a cold cathode tube 50. The configurations, operations and effects similar to those of the above first exemplary embodiment will not be described in duplicate.

Figure 26:
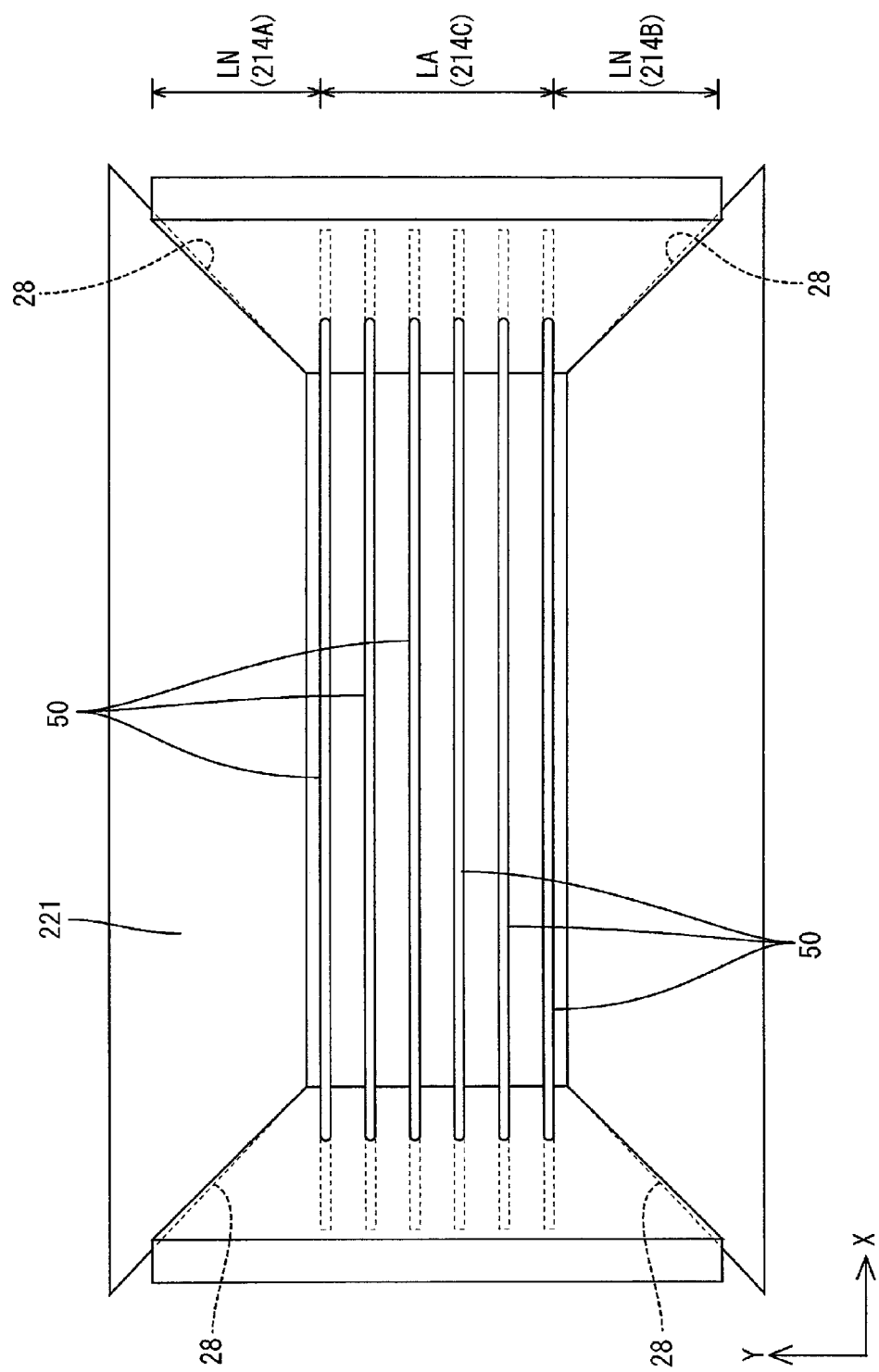
FIG. 26 is a top view depicting a layout of a cold cathode tube and a reflection sheet in a chassis of a third exemplary embodiment according to the aspect of the present invention.

As depicted in FIG. 26, the cold cathode tube 50, which serves as the light source according to this exemplary embodiment, is shaped like an elongated tube (linear shape). The cold cathode tube 50 includes an elongated hollow glass tube with both ends thereof sealed, and a pair of electrodes encapsulated into both ends of the glass tube. The glass tube is encapsulated with mercury and noble gas, and its inner wall surface is applied with a fluorescent material. Both ends of the cold cathode tube 50 are provided with relay connectors (not depicted), and lead terminals protruding from the electrodes to the outside of the glass tube are connected to the relay connectors. Via the relay connectors, the cold cathode tube 50 is connected to an inverter board (not depicted) attached to an outer surface of a bottom plate 214a of a chassis 214, and controllably driven. The cold cathode tube 50 has an smaller outer diameter than the hot cathode tube 40 of the above second exemplary embodiment (which exemplarily has an outer diameter of approximately 15.5 mm), and the outer diameter of the cold cathode tube 50 is exemplarily set at approximately 4 mm.

The above-configured cold cathode tube 50 is arranged in the chassis 214 in a disproportional manner such that six cold cathode tubes 50 are juxtaposed in parallel to each other at predetermined intervals (alignment pitches) with their longitudinal direction (axial directions) coincident with the long-side direction of the chassis 124. Specifically, if the bottom plate 214a of the chassis 214 (portion opposed to a diffuser plate 30) is to be equally divided into in the short-side direction into a first end portion 214A, a second end portion 214B located at an end of the bottom plate 214a opposite to the first end portion 214A, and a center portion 214C interposed between the first and second end portions 214A and 214B, the cold cathode tube 50 is positioned at the center portion 214C of the bottom plate 214a, thereby providing a light-source arranged region LA. The light-source arranged region LA according to this exemplary embodiment is larger than the light-source arranged region LA according to second exemplary embodiment. On the other hand, the first end portion 214A and the second end portion 214B of the bottom plate 214a, at neither of which the cold cathode tube 50 is positioned, provide a no-light-source arranged regions LN. A reflection sheet 221, which is configured similarly to the reflection sheet 121 of the above second exemplary embodiment, includes the facing portions 28.

According to this exemplary embodiment as described above, the light source is provided by the cold cathode tube 50. With this arrangement, a longer lifetime is attainable, and light adjustment is facilitated.

Other Embodiments

The present invention is not limited to the above exemplary embodiments explained in the above description. The following exemplary embodiments may be included in the technical scope of the present invention, for example.

Figure 27:
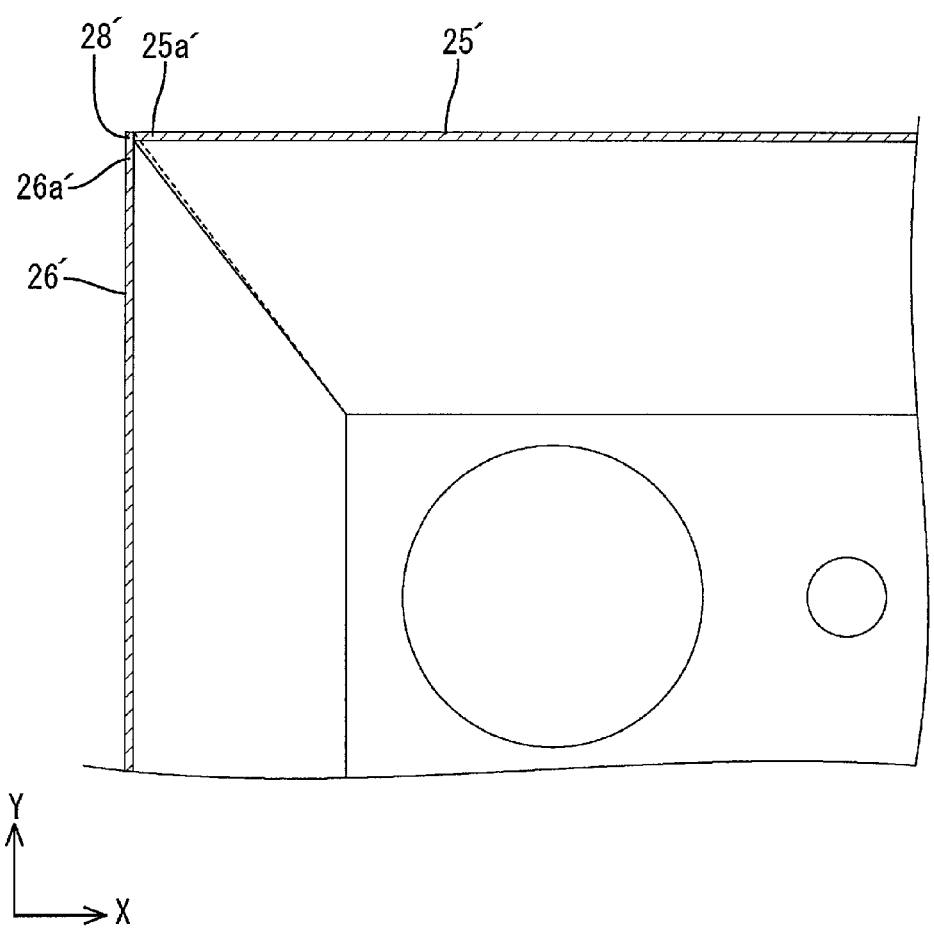
FIG. 27 is a top cross sectional view depicting a relationship between a first raised portion, second raised portion and counter portion of another first exemplary embodiment according to the aspect of the present invention.

(1) According to the above exemplary embodiment(s), the facing portions provided to the side edges of the first raised portions apply to the side edges of the second raised portions the stress that biases the second raised portions toward the front side (i.e., the light exiting side). However, when there is a concern that the first raised portions can be deformed by a thermal expansion, a facing portion 26a' may be provided to a side edge 26a' of a second raised portion 26' such that the facing portions 28' may apply to a side edge 25a' of a first raised portion 25' the stress that biases the first raised portion 25' toward the light exiting side, as depicted in FIG. 27.

Figure 28:
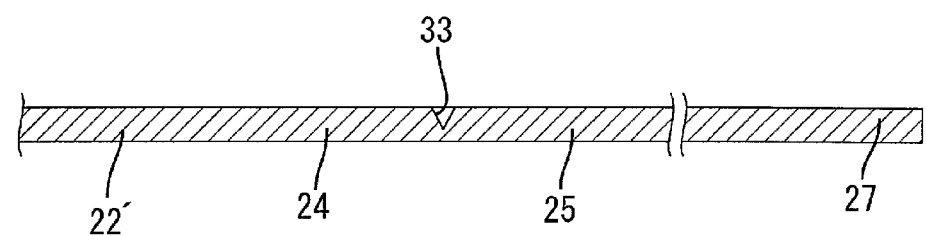
FIG. 28 depicts a cross section of a first raised portion and an extension of a spread first reflection sheet of another second exemplary embodiment according to the aspect of the present invention.
Figure 29:
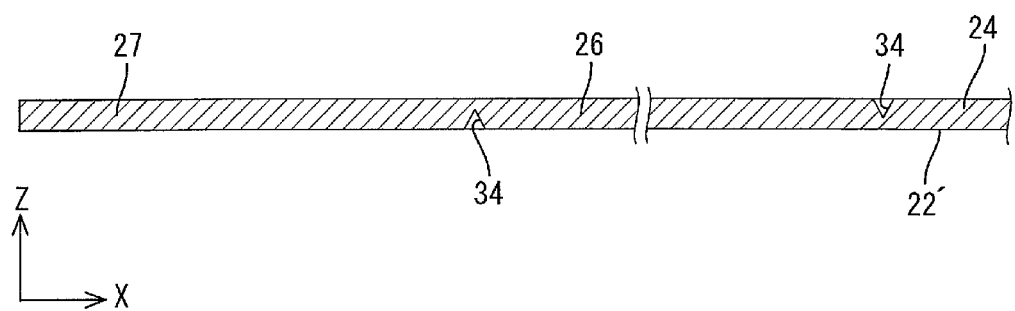
FIG. 29 depicts a cross section of a second raised portion and an extension of a spread first reflection sheet.

(2) While the first reflection sheet (reflection sheet) is provided with the perforations at the bend positions in order to facilitate the formation of the creases according to the above-described exemplary embodiment(s), recesses that does not penetrate the first reflection sheet may be provided at the bend positions in place of the perforations. Specifically, as depicted in FIGS. 28 and 29, the boundaries between the first raised positions 25 and the bottom 24, the boundaries between the second raised portions 26 and the bottom 24, and the boundaries between the second raised portions 26 and the extensions 27, which correspond to the bend positions, may respectively be provided with grooves 33 and 34 that do not penetrate through a first reflection sheet 22' in a sheet-thickness direction. The grooves 33 and 34 for the boundaries between the first raised portions 25 and the bottom 24 and the boundaries between the second raised portions 26 and the bottom 24 (i.e., boundaries to be valley-folded) are formed at a front surface of the first reflection sheet 22. On the other hand, the grooves 34 for the boundaries between the second raised portions 26 and the extensions 27 (i.e., boundaries to be mountain-folded) are formed at a rear surface of the first reflection sheet 22.

(3) While the end faces of the facing portions are substantially in plane with the rear surfaces of the second raised portions when the bent portions of the first reflection sheet (reflection sheet) are bent along the perforations (see, FIG. 17) according to the above-described exemplary embodiments, the facing portions may extend outward (in a direction in which the first raised portions are raised from the bottom) relative to the rear surfaces of the second raised portions when the first reflection sheet is bent. With this arrangement, the facing portions are more reliably abutted on the side edges of the second raised portions.

(4) While the first raised portions and the second raised portions are deformed to form an arched shape according to the above-described exemplary embodiments, the first raised portions and the second raised portions may form a shape other than an arched shape by the deformation in the invention.

(5) While the boundaries between the first raised portions and the extensions are neither provided with the creases nor the recesses (the perforations or the grooves) according to the above-described exemplary embodiments, the boundaries may be provided with the creases or the recesses in the invention. When the creases or the recesses are provided to the boundaries, the extensions continued from the first raised portions are bent preferably to the degree that the extensions and the receiving plate have a clearance therebetween.

(6) While the facing portions are provided to cover the entire length of the side edges of the first raised portions (or the second raised portions) according to the exemplary embodiments, the facing portions may be provided to partially cover the side edges of the first raised portions (or the second raised portions) in the invention.

(7) While the facing portions are provided to both side edges of the first raised portions (or the second raised portions) and thus paired according to the above-described exemplary embodiments, the facing portions may be provided to either ones of the side edges of the first raised portions (or the second raised portions). In addition, both of the paired first raised portions (or both of the paired second raised portions) may be provided with the facing portions, or alternatively, either one of the paired first raised portions (or either one of the paired second raised portions) may only be provided with the facing portion(s) without providing the facing portion(s) to the other one of the paired first raised portions (or the other one of the paired second raised portions).

(8) While the first reflection sheet (reflection sheet) has the transversely rectangular bottom according to the exemplary embodiments, the bottom may be, for instance, square, in the invention.

(9) While the LEDs (the light source) are provided in a dispersed manner to cover substantially all over the bottom plate of the chassis (the bottom of the first reflection sheet) according to the first exemplary embodiment, the LEDs may be, for instance, gathered around the middle portion of the bottom plate of the chassis as in the above-described second and third exemplary embodiments. When the LEDs are gathered around the middle portion of the bottom plate, by using a diffuser plate having a light reflector as in second and third exemplary embodiments, the light let out from the backlight unit may exhibit uniform brightness without unevenness

(10) While the LEDs, i.e., one type of point light source, are used as the light source according to the first exemplary embodiment, the light source may be another point light source in the invention. Other than the point light source, the light source may alternatively be a surface light source such as an organic EL.

(11) While the single hot cathode tube is used as the light source according to the above-described second exemplary embodiment, the light source may be two or more hot cathode tubes in the invention. Likewise, while the six cold cathode tubes are used as the light source according to the third exemplary embodiment, the light source may be five or less cold cathode tubes or seven or more cold cathode tubes in the invention.

(12) While the hot cathode tube(s) or the cold cathode tube(s) (i.e., one type of fluorescent tube (line light source)) is used as the light source according to the second and third exemplary embodiments, the light source may be another fluorescent tube in the invention. Other than fluorescent tubes, the light source may be an electric discharge tube such as a mercury lamp in the invention.

(13) While the single type of the light source is employed according to the exemplary embodiments, plurality of types of the light sources may be used together in the invention. Specifically, the hot cathode tube and the cold cathode tube may be used together, the LEDs and the hot or cold cathode tube may be used together, or the LEDs and the hot and cold cathode tubes may be used together.

(14) While the center portion of the chassis provides the light-source arranged region and the first and the second end portions thereof provide the no-light-source arranged regions according to the second and third exemplary embodiments, at least either one of the first and second end portions of the chassis may provide a light-source arranged region with the other portions of the chassis providing the no-light-source arranged regions in the invention. When the above arrangement is employed, the first end portion and the center portion may both provide light-source arranged regions, or alternatively the second end portion and the center portion may both provide light-source arranged regions. When the position of the light source is changed as in the above, the dot pattern of the light reflector of the diffuser plate may also be changed in accordance therewith.

(15) While the liquid crystal panel and the chassis are used in a vertically standing posture with their short-side directions coincident with the vertical direction according to the exemplary embodiments, the liquid crystal panel and the chassis may be used in a vertically standing posture with their long-side directions coincident with the vertical direction in the invention.

(16) While a TFT is used as the switching component for the liquid crystal display device according to the above-described exemplary embodiments, the switching component for the liquid crystal display device may be a switching component other than TFT, such as a thin-film diode (TFD). In addition, the liquid crystal display device may be a color display device or alternatively a black-and-white display device.

(17) While the liquid crystal display device using the liquid crystal panel as its display panel is exemplified in the above-described exemplary embodiments, the present invention is applicable to display devices using the other-type display panels.

(18) While the television receiver including the tuner is exemplified in the above-described exemplary embodiments, the present invention is applicable to display devices not including tuners.

EXPLANATION OF SYMBOLS 10, 110: Liquid crystal display device (Display device)
11: Liquid crystal panel (Display panel)
12, 112: Backlight unit (Lighting device)
14, 114: Chassis
14a, 114, 214: Bottom plate
14c: Side plate
14d: Receiving plate
15, 115: Optical member
15a, 115a: Diffuser plate (optical member)
17: LED (light source)
18: LED board
19: Diffusing lens
21: Reflection sheet (Reflection member)
22: First reflection sheet (Reflection member)
24: Bottom
25: First raised portion (One raised portion)
25a: Side edge
26: Second raised portion (Another raised portion)
26a: Side edge
27: Extension
28: Facing portion
29, 31: Crease
30, 32: Perforation (Recess)
33, 34: Groove (Recess)
40: Hot cathode tube (Light source)
41: Light reflector
50: Cold cathode tube (Light source)
114A, 214A: First end portion
114B, 214B: Second end portion
114C, 214C: Center portion
115a1: First surface (Surface opposed to light source)
121, 221: Reflection sheet
BP1: Boundary
BP2: Boundary
DA: Light-source superposed section (Section superposed over light-source arranged region)
DN: No-light-source superposed section (Section superposed over no-light-source arranged region)
J: Joint
LA: Light-source arranged region
LN: No-light-source arranged region
S: Space
TV: Television receiver

The invention claimed is:

1. A lighting device, comprising:
a light source;
a chassis including a bottom plate provided on a side opposite to a light exit side with respect to the light source, the chassis housing the light source; and
a reflection member configured to reflect light and including a quadrangular bottom portion and at least two raised portions, the quadrangular bottom portion arranged along the bottom plate, and each of the at least two raised portions being raised from at least two adjacent sides of the quadrangular bottom portion respectively toward the light exit side, the at least two raised portions extend continuously along entire lengths of the at least two adjacent sides of the quadrangular bottom portion and the at least two raised portions define a joint between two adjacent raised portions, wherein:
the at least two raised portions include one raised portion and another raised portion, and the one raised portion bulges toward the light output side to define an arched shape which is arched in only a single direction;
further comprising an optical member provided on an optical member provided on a side closer to the light exit side with respect to the light source, wherein: at least the one raised portion includes an extending portion at a distal end thereof and the extending portion extends outwardly; and the chassis includes a receiving plate configured to sandwich the extending portion with the optical member, wherein the other raised portion bulges toward the light exit side together with the one raised portion to define an arched shape.

2. The lighting device according to claim 1, wherein:
the quadrangular bottom portion has an elongated quadrangular shape; and
the other raised portion is raised from a short side of the quadrangular bottom portion and the one raised portion is raised from a long side of the quadrangular bottom portion.

3. The lighting device according to claim 2, wherein:
the other raised portion is raised from each of paired short sides of the quadrangular bottom portion and the one raised portion is raised from each of paired long sides of the quadrangular bottom portion.

4. The lighting device according to claim 3, wherein the paired other raised portions are raised from the quadrangular bottom portion at a raising angle substantially equal to a raising angle at which the paired one raised portions are raised from the quadrangular bottom portion.

5. The lighting device according to claim 1, wherein the quadrangular bottom portion and the one raised portion form a boundary that is bent with a crease and the one raised portion and the extending portion form a boundary that is curved without a crease.

6. The lighting device according to claim 5, wherein out of the boundary between the quadrangular bottom portion and the one raised portion and the boundary between the one raised portion and the extending portion, the boundary between the quadrangular bottom portion and the one raised portion is provided with a recess that facilitates defining of the crease.

7. The lighting device according to claim 6, wherein:
the other raised portion includes an extending portion at a distal end thereof and the extending portion extends outward; and
the quadrangular bottom portion and the other raised portion form a boundary and the other raised portion and the extending portion form a boundary and the boundaries are each provided with a recess that facilitates forming of the crease.

8. The lighting device according to claim 6, wherein the recess includes perforations arranged linearly at intervals.

9. The lighting device according to claim 1, wherein the raised portions are inclined with respect to the quadrangular bottom portion.

10. The lighting device according to claim 9, wherein the raised portions are substantially linear.

11. The lighting device according to claim 1, wherein the chassis further includes a side plate that stands from the bottom plate, the side plate defining a space with the raised portions and facing the raised portions.

12. The lighting device according to claim 1, wherein the light source is an LED.

13. The lighting device according to claim 12, wherein:
the LED includes a plurality of LEDs; and
the LEDs are mounted on an LED board that extends parallel to the bottom plate and the quadrangular bottom portion.

14. The lighting device according to claim 12, further comprising a diffusing lens provided on the light exit side relative to the LED and configured to diffuse light from the LED and exit the light therefrom.

15. The lighting device according to claim 1, wherein:
the chassis includes a portion facing the optical member and the portion is divided into a light-source arranged region in which the light source is arranged and an empty region in which no light source is arranged; and
the optical member includes a portion that overlaps the light-source arranged region and a portion that overlaps the empty region, and light reflectance is higher on at least a surface of the portion overlapping the light-source arranged region facing the light source than on at least a surface of the portion overlapping the empty region.

16. The lighting device according to claim 15, wherein:
the chassis includes a portion facing the optical member and the portion is divided into at least a first end portion, a second end portion located at an end opposite to the first end portion, and a middle portion provided between the first end portion and the second end portion; and
the middle portion corresponds to the light-source arranged region and the first end portion and the second end portion correspond to the empty region.

17. The lighting device according to claim 15, wherein the light source is a cold cathode tube.

18. The lighting device according to claim 15, wherein the light source is a hot cathode tube.

19. A display device, comprising:
the lighting device according to claim 1; and
a display panel adapted to display with use of light from the lighting device.

20. The display device according to claim 19, wherein the display panel is a liquid crystal panel configured such that liquid crystal is enclosed in between a pair of substrates.

21. A television receiver, comprising the display device according to claim 19.

* * * * *